United States Patent
Waller, Jr. et al.

(10) Patent No.: US 7,553,417 B2
(45) Date of Patent: Jun. 30, 2009

(54) FUNCTIONALIZED SUBSTRATES

(75) Inventors: Clinton P. Waller, Jr., White Bear Lake, MN (US); Douglas Eugene Weiss, Golden Valley, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/611,301

(22) Filed: Dec. 15, 2006

(65) Prior Publication Data

US 2007/0154703 A1 Jul. 5, 2007

Related U.S. Application Data

(60) Provisional application No. 60/755,244, filed on Dec. 30, 2005, provisional application No. 60/755,267, filed on Dec. 30, 2005.

(51) Int. Cl.
*B01D 71/24* (2006.01)
(52) U.S. Cl. .............. 210/500.27; 210/500.1; 210/500.22; 210/500.28; 210/500.35; 210/500.36; 210/500.38; 210/500.43; 210/506; 210/507; 210/508; 210/509; 428/319.3; 428/319.7; 428/319.9
(58) Field of Classification Search .............. 210/500.1, 210/500.22, 500.27, 500.28, 500.35, 500.36, 210/500.38, 500.43, 506–509; 428/319.3, 428/319.7, 319.9
See application file for complete search history.

(56) References Cited

U.S. PATENT DOCUMENTS

| | | | |
|---|---|---|---|
| 4,157,418 A | 6/1979 | Heilmann | |
| 4,539,256 A | 9/1985 | Shipman | |
| 4,563,388 A | 1/1986 | Bonk et al. | |
| 4,726,989 A | 2/1988 | Mrozinski | |
| 4,867,881 A | 9/1989 | Kinzer | |
| 4,944,879 A | 7/1990 | Steuck | |
| 4,981,730 A | 1/1991 | Zaleski | |
| 5,064,866 A * | 11/1991 | Toyomoto et al. | 521/27 |
| 5,075,342 A * | 12/1991 | Ishigaki et al. | 521/27 |
| 5,120,594 A | 6/1992 | Mrozinski | |
| 5,180,492 A | 1/1993 | Ohnishi et al. | |
| 5,209,849 A | 5/1993 | Hu et al. | |
| 5,260,360 A | 11/1993 | Mrozinski et al. | |
| 5,330,830 A * | 7/1994 | Miyamori et al. | 428/304.4 |
| 5,336,698 A * | 8/1994 | Kashiwagi et al. | 523/113 |
| 5,350,805 A * | 9/1994 | Lin | 525/121 |
| 5,503,746 A | 4/1996 | Gagnon | |
| 5,531,900 A | 7/1996 | Raghavan et al. | |
| 5,623,044 A | 4/1997 | Chiao | |
| 5,736,051 A | 4/1998 | Degen et al. | |
| 5,804,263 A | 9/1998 | Goldberg et al. | |
| 5,914,182 A | 6/1999 | Drumheller | |
| 5,962,544 A | 10/1999 | Waller, Jr. | |
| 6,039,872 A | 3/2000 | Wu et al. | |
| 6,063,484 A * | 5/2000 | Exsted et al. | 428/315.5 |
| 6,280,853 B1 * | 8/2001 | Mickols | 428/474.4 |
| 6,287,730 B1 | 9/2001 | Callahan et al. | |
| 6,537,411 B1 | 3/2003 | Kang et al. | |
| 6,596,167 B2 | 7/2003 | Ji et al. | |
| 6,660,376 B1 | 12/2003 | Zimmel et al. | |
| 6,811,837 B2 | 11/2004 | Iwasa et al. | |
| 7,135,230 B2 * | 11/2006 | Nakao et al. | 428/403 |
| 2005/0058821 A1 | 3/2005 | Smith et al. | |
| 2005/0133441 A1 | 6/2005 | Charkoudian | |
| 2006/0016748 A1 * | 1/2006 | Koguma et al. | 210/490 |
| 2007/0039874 A1 * | 2/2007 | Kniajanski et al. | 210/500.37 |
| 2007/0042015 A1 * | 2/2007 | Berry et al. | 424/423 |

FOREIGN PATENT DOCUMENTS

| | | |
|---|---|---|
| WO | WO89/09246 | 10/1989 |
| WO | WO97/18904 | 5/1997 |
| WO | WO00/22032 | 4/2000 |
| WO | WO01/96487 | 12/2001 |
| WO | WO03/008011 | 1/2003 |
| WO | WO2005/035641 | 4/2005 |

OTHER PUBLICATIONS

Davies, C. N., "The Separation of Airborne Dust and Particles," Institution of Mechanical Engineers, London, Proceedings 1B, 1952.
Wente, Van A., "Superfine Thermoplastic Fibers," *Industrial Engineering Chemistry*, vol. 48, pp. 1342-1346 (Aug. 1956).
Wente, Van A., et al., "Manufacture of Super Fine Organic Fibers", Report No. 4364 of the Naval Research Laboratories, published May 25, 1954.

* cited by examiner

*Primary Examiner*—Hai Vo
(74) *Attorney, Agent, or Firm*—Kent S. Kokko

(57) ABSTRACT

Functionalized substrates, methods of making functionalized substrates, and methods of using functionalized substrates are disclosed.

7 Claims, 1 Drawing Sheet

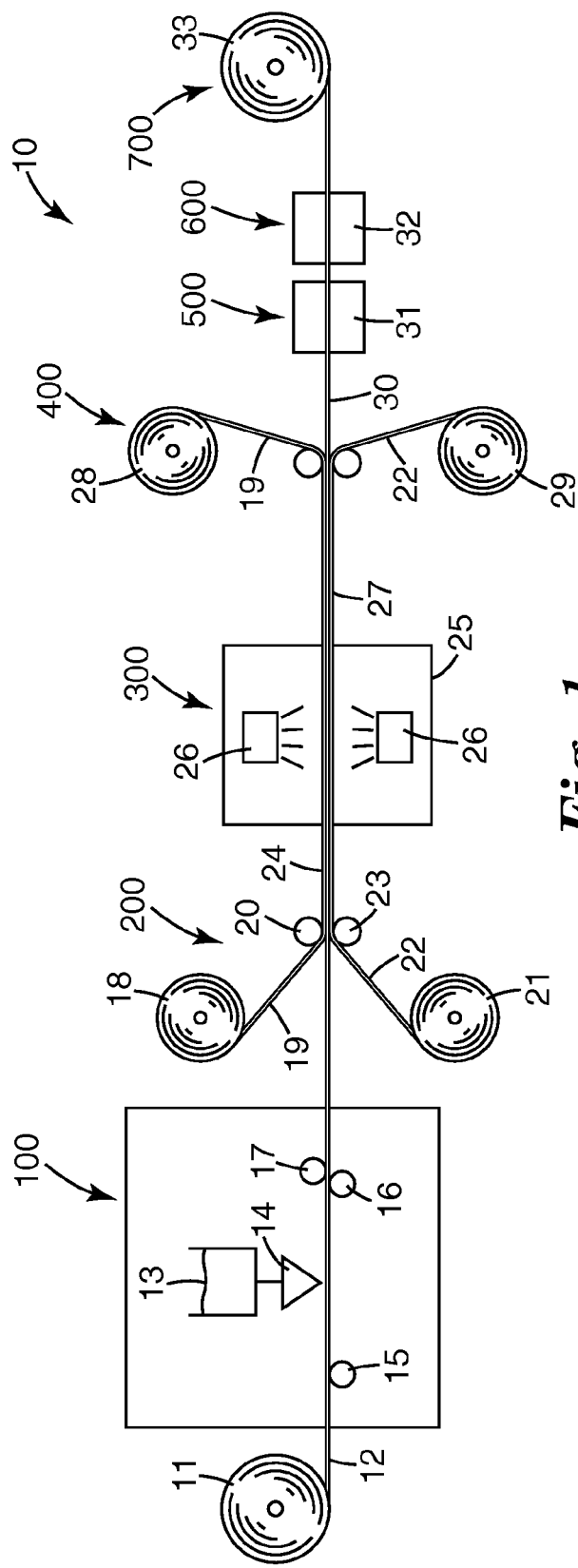
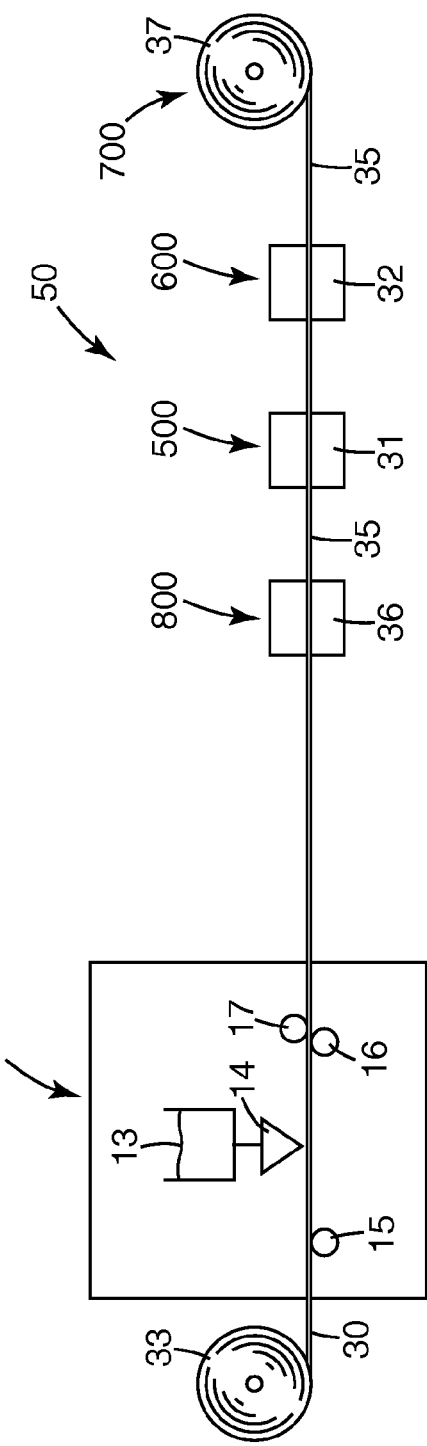
Fig. 1
Fig. 2

FUNCTIONALIZED SUBSTRATES

CROSS-REFERENCE TO RELATED APPLICATIONS

This patent application claims the benefit of priority to U.S. provisional patent application Ser. No. 60/755,244 entitled "METHODS OF MAKING FUNCTIONALIZED SUBSTRATES" filed on Dec. 30, 2005, and U.S. provisional patent application Ser. No. 60/755,267 entitled "FUNCTIONALIZED SUBSTRATES" filed on Dec. 30, 2005, the subject matter of both of which are incorporated herein in their entirety.

TECHNICAL FIELD

The present disclosure relates to functionalized substrates.

BACKGROUND

There is a need in the art for polymeric substrates having enhanced functionality. Further, there is a need in the art for methods of making polymeric substrates having enhanced functionality.

SUMMARY OF THE INVENTION

The present invention is directed to functionalized substrates and methods of making functionalized substrates. More specifically, the functionalized substrates include a porous base substrate that has been modified to provide different functionality and/or reactivity, different affinity (i.e., increased or decreased) for one or more compounds, or a combination thereof.

An article is provided that includes a functionalized substrate comprising a porous base substrate having interstitial and outer surfaces; and grafted species extending from the interstitial and outer surfaces of the porous base substrate. At least one of the grafted species comprises (i) an ethylenically unsaturated group, (ii) an epoxy group or a ring-opened epoxy linkage group, (iii) an azlactone group or a ring-opened azlactone linkage group, (iv) an isocyanato group, urethane linkage group, or urea linkage group, (v) an ionic group, (vi) an alkylene oxide group, or any combination of (i) to (vi). The functionalized substrate may be used as a final product or as an intermediate product in which an additional reactant is bonded to the functionalized substrate by reacting with the ethylenically unsaturated group, epoxy group, azlactone group, isocyanato group, ionic group, or combination thereof.

These and other features and advantages of the present invention will become apparent after a review of the following detailed description of the disclosed embodiments and the appended claims.

BRIEF DESCRIPTION OF THE DRAWINGS

The present invention is further described with reference to the appended figures, wherein:

FIG. 1 depicts exemplary method steps for making functionalized substrates of the present invention; and FIG. 2 depicts exemplary method steps for making functionalized substrates of the present invention.

DETAILED DESCRIPTION OF THE INVENTION

Although the present invention is herein described in terms of specific embodiments, it will be readily apparent to those skilled in this art that various modifications, rearrangements, and substitutions can be made without departing from the spirit of the invention. The scope of the present invention is thus only limited by the claims appended hereto.

Functionalized substrates and methods of making functionalized substrates are described. Various functional groups or species are grafted onto the surfaces of a porous base substrate. These grafted functional groups or species often alter the surface properties or reactivity of the porous base substrate.

I. Functionalized Substrates

Compared to the porous base substrate before surface modification, the functionalized substrate typically has a different functionality and/or reactivity, a different affinity (i.e., increased or decreased) for one or more compounds, or a combination thereof. Components of the functionalized substrate and physical properties of the functionalized substrate are described.

A. Functionalized Substrate Components

The functionalized substrate comprises a number of components including, but not limited to, (a) a porous base substrate having interstitial and outer surfaces and (b) grafted species extending from the surfaces of the porous base substrate. Exemplary components for forming the functionalized substrates of the present invention are provided below.

1. Porous Base Substrate

The functionalized substrate comprises a porous base substrate. Suitable porous base substrates include, but are not limited to, porous membranes, porous nonwoven webs, and porous fibers. The porous base substrate may be formed from any suitable polymeric material. Suitable polymeric materials include, but are not limited to, polyolefins, poly(isoprenes), poly(butadienes), fluorinated polymers, chlorinated polymers, polyesters, polyamides, polyimides, polyethers, poly(ether sulfones), poly(sulfones), polyphenylene oxides, poly(vinyl acetates), copolymers of vinyl acetate, poly(phosphazenes), poly(vinyl esters), poly(vinyl ethers), poly(vinyl alcohols), and poly(carbonates). Suitable polyolefins include, but are not limited to, poly(ethylene), poly(propylene), poly(1-butene), copolymers of ethylene and propylene, alpha olefin copolymers (such as copolymers of 1-butene, 1-hexene, 1-octene, and 1-decene), poly(ethylene-co-1-butene) and poly(ethylene-co-1-butene-co-1-hexene). Suitable fluorinated polymers include, but are not limited to, poly(vinyl fluoride), poly(vinylidene fluoride), copolymers of vinylidene fluoride (such as poly(vinylidene fluoride-co-hexafluoropropylene), and copolymers of chlorotrifluoroethylene (such as poly(ethylene-co-chlorotrifluoroethylene). Suitable polyamides include, but are not limited to, poly(imino(1-oxohexamethylene)), poly(iminoadipoyliminohexamethylene), poly(iminoadipoyliminodecamethylene), and polycaprolactam. Suitable polyimides include, but are not limited to, poly(pyromellitimide). Suitable poly(ether sulfones) include, but are not limited to, poly(diphenylether sulfone) and poly(diphenylsulfone-co-diphenylene oxide sulfone). Suitable copolymers of vinyl acetate include, but are not limited to, poly(ethylene-co-vinyl acetate) and such copolymers in which at least some of the acetate groups have been hydrolyzed to afford various poly(vinyl alcohols).

In one exemplary embodiment, the porous base substrate comprises a microporous base substrate having an average pore size that is typically less than about 1.0 microns. Suitable microporous base substrates include, but are not limited to, microporous membranes, microporous nonwoven webs, and microporous fibers. The microporous base substrate is often hydrophobic and comprises one or more of the above-mentioned polymeric materials.

In some embodiments, the porous base substrate is a hydrophobic microporous membrane such as a thermally-induced phase separation (TIPS) membrane. TIPS membranes are often prepared by forming a solution of a thermoplastic material and a second material above the melting point of the thermoplastic material. The second material is a liquid above the melting point of the thermoplastic material. Upon cooling, the thermoplastic material crystallizes and phase separates from the second material. The crystallized thermoplastic material is often stretched. The second material is optionally removed either before or after stretching. Microporous membrane are further disclosed in U.S. Pat. Nos. 4,539,256, 4,726, 989, 4,867,881, 5,120,594, 5,260,360, 5,962,544, and 5,962, 544, all of which are assigned to 3M Company (St. Paul, Minn.), the subject matter of all of which is hereby incorporated by reference in its entirety. Some exemplary TIPS membrane comprise poly(vinylidene fluoride) (i.e., PVDF), polyolefins such as poly(ethylene) or poly(propylene), vinyl-containing polymers or copolymers such as ethylene-vinyl alcohol copolymers and butadiene-containing polymers or copolymers, and acrylate-containing polymers or copolymers. For some applications, a TIPS membrane comprising PVDF is particularly desirable. TIPS membranes comprising PVDF are further described in U.S. Patent Application Publication No. 2005/0058821, which is assigned to 3M Company (St. Paul, Minn.), the subject matter of which is hereby incorporated by reference in its entirety.

In other embodiments, the porous base substrate is a nonwoven web. For example, the nonwoven web can be prepared from ethylene-vinyl alcohol copolymers as described in U.S. Pat. No. 5,962,544.

Both hydrophobic and hydrophobic microporous membranes are commercially available, for example, from Millipore Corp. (Billerica, Mass.) under the trade designation "DURAPORE" and "MILLIPORE EXPRESS MEMBRANE"; or from Pall Corp. (East Hills, N.Y.) under the trade designation "NYLAFLO" and "SUPOR".

2. Grafted Species

The functionalized substrate has grafted species attached to the surfaces of the porous base substrate. The grafting of materials to the surface of the porous base substrate often results in an alteration of the surface properties or reactivity of the porous base substrate. The materials that are grafted to the surface of the porous base substrates are typically monomers (i.e., grafting monomers). The grafting monomers usually have both (a) a free-radically polymerizable group and (b) at least one additional function group thereon. The free-radically polymerizable group is typically an ethylenically unsaturated group such as a (meth)acryloly group or a vinyl group. The free-radically polymerizable group typically can react with the surface of the porous base substrate when exposed to an electron beam. That is, reaction of the free-radically polymerizable groups of the grafting monomers with the surface of the porous base substrate in the presence of the electron beam results in the formation of grafted species attached to the porous base substrate. One or more grafting monomers may be grafted onto interstitial and outer surfaces of the porous base substrate to tailor the surface properties to the resulting functionalized substrate.

In addition to having a free-radically polymerizable group, suitable grafting monomers typically have an additional functional group selected from a second ethylenically unsaturated group, an epoxy group, an azlactone group, an isocyanato group, an ionic group, an alkylene oxide group, or combination thereof. The additional functional group can provide a site of further reactivity or affinity. That is, in some embodiments, after the grafting monomer has been attached to the porous base substrate through a reaction involving the free-radically polymerizable group, the additional functional group of the resulting grafted species can be reacted further. For example, the additional functional group can react to form a linkage group between the porous base substrate and other materials such as other monomers or nucleophilic compounds having at least one nucleophilic group. In other examples, the additional functional group can impart a desired surface property to the functionalized substrate such as affinity for a particular type of compound. If the grafted species contains an ionic group, the functionalized substrate will often have an affinity for compounds having an opposite charge. That is, compounds with negatively charged groups can be attracted to a functionalized substrate having grafted species with a cationic group and compounds with positively charged groups can be attracted to a functionalized substrate having grafted species with an anionic group. Further, the grafted species can impart a hydrophilic surface to the functionalized substrate that includes a porous base substrate having a hydrophobic surface prior to surface modification with the grafted species. That is, the grafted species contain an alkylene oxide group can impart a hydrophilic character to the resulting functionalized substrate.

Some grafting monomers have a (a) free-radically polymerizable group that is a first ethylenically unsaturated group and (b) an additional functional group that is a second ethylenically unsaturated group. Suitable grafting monomers having two ethylenically unsaturated groups include, but are not limited to, polyalkylene glycol di(meth)acrylates. The term polyalkylene glycol di(meth)acrylate is used interchangeably with the term polyalkylene oxide di(meth)acrylate. The term "(meth)acryl" as in (meth)acrylate is used to encompass both acryl groups as in acrylates and methacryl groups as in methacrylates. Exemplary polyalkylene glycol di(meth)acrylates include polyethylene glycol di(meth)acrylate monomers and polypropylene glycol di(meth)acrylates monomers. Polyethylene glycol diacrylate monomer having an average molecular weight of about 400 g/mole is commercially available, for example, under the trade designation "SR344" and polyethylene glycol dimethacrylate monomer having an average molecular weight of about 400 g/mole is commercially available under the trade designation "SR603" from Sartomer Co., Inc., Exton, Pa.

In one exemplary embodiment, the grafted species result from the reaction of a polyethylene glycol di(meth)acrylate monomers with the porous base substrate upon exposure to an electron beam. These grafting monomers can be used to change a hydrophobic porous base substrate into a hydrophilic functionalized substrate due to the presence of the polyalkylene oxide group. In one desired embodiment, the polyethylene glycol di(meth)acrylate monomers comprise a polyethylene glycol dimethacrylate monomer (e.g., polyethylene glycol dimethacrylate having an average molecular weight of about 400 g/mole) alone or in combination with other monomers. The resulting functionalized can have a number of desired properties such as instant wettability following exposure to 1N NaOH for 20 hours as described in more detail below.

Some grafting monomers have a (a) free-radically polymerizable group that is a first ethylenically unsaturated group and (b) an additional functional group that is an epoxy group. Suitable grafting monomers within this class include, but are not limited to, glycidyl (meth)acrylates. This class of grafting monomers can provide a functionalized substrate having at least one epoxy group available for further reactivity. The epoxy group can react with other reactants such as another monomer or with a nucleophilic compound to impart a desired surface property to the porous base substrate (e.g., affinity for a particular compound or functional group having different reactivity). The reaction of the epoxy group with a nucleophilic compound, for example, results in the opening of the epoxy ring and the formation a linkage group that functions to attach the nucleophilic compound to the porous base substrate. The nucleophilic compound typically contains at least one nucleophilic group. Suitable nucleophilic groups for reacting with epoxy groups include, but are not limited to, primary amino groups, secondary amino groups, and carboxy groups. The nucleophilic compound can contain additional nucleophilic groups that can crosslink multiple epoxy groups or can contain other optional groups that can impart a hydrophilic character to the functionalized substrate. The linkage group formed by ring-opening of the epoxy group often contains the group —C(OH)HCH$_2$NH— when the epoxy is reacted with a primary amino group or —C(OH)HCH$_2$O(CO)— when the epoxy is reacted with a carboxy group.

In some embodiments, the epoxy groups can be reacted with a multifunctional amine such as a diamine having two primary amino groups or a triamine having three primary amino groups. One of the amino groups can undergo a ring opening reaction with the epoxy group and result in the formation of a linkage group that contains the group —C(OH)HCH$_2$NH— between the nucleophilic compound and the porous bases substrate. The second amino group or the second and third amino groups can import a hydrophilic character to the functionalized substrate or can crosslink two or more grafted species by reacting with one or more additional epoxy groups. In some examples, the multifunctional amine is a polyalkylene glycol diamine or polyalkylene glycol triamine and reaction with an epoxy group results in the attachment of a grafted species having a polyalkylene glycol group (i.e., polyalkylene oxide group). The polyalkylene glycol group as well as any terminal primary amino group tends to impart a hydrophilic character to the functionalized substrate.

Other grafting monomers have a (a) free-radically polymerizable group that is an ethylenically unsaturated group and (b) an additional functional group that is an azlactone group. Suitable grafting monomers include, but are not limited to, vinyl azlactone such as 2-vinyl-4,4-dimethylazlactone. This class of grafting monomers can provide a functionalized substrate having at least one azlactone group available for further reactivity. The azlactone group can react with other reactants such as another monomer or with a nucleophilic compound to impart a desired surface property to the porous base substrate (e.g., affinity for a particular compound or functional group having different reactivity). The reaction of the azlactone group with a nucleophilic compound, for example, results in the opening of the azlactone ring and the formation of a linkage group that functions to attach the nucleophilic compound to the porous base substrate. The nucleophilic compound typically contains at least one nucleophilic group. Suitable nucleophilic groups for reacting with an azlactone group include, but are not limited to, primary amino groups, secondary amino groups and hydroxy groups. The nucleophilic compound can contain additional nucleophilic groups that can crosslink multiple azlactone groups or can contain other optional groups that can impart a hydrophilic character to the functionalized substrate. The linkage group formed by ring-opening of the azlactone group often contains the group —(CO)NHCR$_2$(CO)— where R is an alkyl such as methyl and (CO) denotes a carbonyl.

In some embodiments, the azlactone groups can be reacted with a multifunctional amine such as a diamine having two primary amino groups or a triamine having three primary amino groups. One of the amino groups can undergo a ring opening reaction with the azlactone group and result in the formation of a linkage containing the group —(CO)NHCR$_2$(CO)— between the nucleophilic compound and the porous base substrate. The second amino group or second and third amino groups can import a hydrophilic character to the functionalized substrate or can crosslink multiple grafted species. In some examples, the multifunctional amine is a polyalkylene glycol diamine or a polyalkylene glycol triamine and reaction with an azlactone group results in the attachment of a grafted species having a polyalkylene glycol group (i.e., polyalkylene oxide group). The polyalkylene glycol group as well as any terminal primary amino group tends to impart a hydrophilic character to the functionalized substrate.

Still other grafting monomers have a (a) free-radically polymerizable group that is an ethylenically unsaturated group and (b) an additional functional group that is an isocyanato group. Suitable grafting monomers include, but are not limited to an isocyanatoalkyl (meth)acrylate such as 2-isocyanatoethyl methacrylate and 2-isocyanatoethyl acrylate. This class of grafting monomers can provide a functionalized substrate having at least one isocyanato group available for reactivity. The isocyanato group can react with other reactants such as another monomer or with a nucleophilic compound to impart a desired surface property to the functionalized substrate (e.g., affinity for a particular compound or functional group having different reactivity). The reaction of an isocyanato group with a nucleophilic compound can result in the formation of a urea linkage if the nucleophilic group is a primary amino or secondary amino group or in the formation of a urethane linkage if the nucleophilic group is a hydroxy group. The nucleophilic compound can contain additional nucleophilic groups that can crosslink multiple isocyanato groups or can contain other optional groups that can impart a hydrophilic character to the functionalized substrate. The linkage group formed by reaction of a nucleophilic compound with an isocyanato group often contains the group —NH(CO)NH— when the nucleophilic group is a primary amino group or —NH(CO)O— when the nucleophilic group is a hydroxy.

Yet other grafting monomers have a (a) free-radically polymerizable group that is an ethylenically unsaturated group and (b) an additional functional group that is an ionic group. The ionic group can have a positive charge, a negative charge, or a combination thereof. With some suitable ionic monomers, the ionic group can be neutral or charged depending on the pH conditions. This class of monomers is typically used to impart a desired surface affinity for one or more oppositely charged compounds or to decrease the affinity for one or more similarly charged compounds.

Some exemplary ionic grafting monomers having a negative charge include (meth)acrylamidosulfonic acids of Formula II or salts thereof.

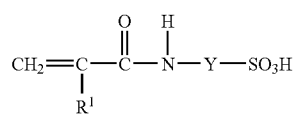

I

In Formula I, $R^1$ is hydrogen or methyl; and Y is a straight or branched alkylene (e.g., an alkylenes having 1 to 10 carbon atoms, 1 to 6 carbon atoms, or 1 to 4 carbon atoms). Exemplary ionic monomers according to Formula I include, but are not limited to, N-acrylamidomethanesulfonic acid, 2-acrylamidoethanesulfonic acid, 2-acrylamido-2-methyl-1-propanesulfonic acid, and 2-methacrylamido-2-methyl-1-propanesulfonic acid. Salts of these acidic monomers can also be used. Counter ions for the salts can be, for example, ammonium ions, potassium ions, lithium ions, or sodium ions.

Other suitable ionic grafting monomers having a negative charge include sulfonic acids such as vinylsulfonic acid and 4-styrenesulfonic acid; (meth)acrylamidophosphonic acids such as (meth)acrylamidoalkylphosphonic acids (e.g., 2-acrylamidoethylphosphonic acid and 3-methacrylamidopropylphosphonic acid); acrylic acid and methacrylic acid; and carboxyalkyl(meth)acrylates such as 2-carboxyethylacrylate, 2-carboxyethylmethacrylate, 3-carboxypropylacrylate, and 3-carboxypropylmethacrylate. Still other suitable acidic monomers include (meth)acryloylamino acids, such as those described in U.S. Pat. No. 4,157,418 (Heilmann), incorporated herein by reference. Exemplary (meth)acryloylamino acids include, but are not limited to, N-acryloylglycine, N-acryloylaspartic acid, N-acryloyl-β-alanine, and 2-acrylamidoglycolic acid. Salts of any of these acidic monomers can also be used.

Some exemplary ionic grafting monomers that are capable of providing a positive charge are amino (meth)acrylates or amino (meth)acrylamides of Formula II or quaternary ammonium salts thereof. The counter ions of the quaternary ammonium salts are often halides, sulfates, phosphates, nitrates, and the like.

In Formula II, $R^1$ is hydrogen or methyl; L is oxy or —NH—; and Y is an alkylene (e.g., an alkylene having 1 to 10 carbon atoms, 1 to 6, or 1 to 4 carbon atoms). Each $R^2$ is independently hydrogen, alkyl, hydroxyalkyl (i.e., an alkyl substituted with a hydroxy), or aminoalkyl (i.e., an alkyl substituted with an amino). Alternatively, the two $R^2$ groups taken together with the nitrogen atom to which they are attached can form a heterocyclic group that is aromatic, partially unsaturated (i.e., unsaturated but not aromatic), or saturated, wherein the heterocyclic group can optionally be fused to a second ring that is aromatic (e.g., benzene), partially unsaturated (e.g., cyclohexene), or saturated (e.g., cyclohexane).

In some embodiments of Formula II, both $R^2$ groups are hydrogen. In other embodiments, one $R^2$ group is hydrogen and the other is an alkyl having 1 to 10, 1 to 6, or 1 to 4 carbon atoms. In still other embodiments, at least one of $R^2$ groups is a hydroxy alkyl or an amino alkyl that have 1 to 10, 1 to 6, or 1 to 4 carbon atoms with the hydroxy or amino group being positioned on any of the carbon atoms of the alkyl group. In yet other embodiments, the $R^2$ groups combine with the nitrogen atom to which they are attached to form a heterocyclic group. The heterocyclic group includes at least one nitrogen atom and can contain other heteroatoms such as oxygen or sulfur. Exemplary heterocyclic groups include, but are not limited to imidazolyl. The heterocyclic group can be fused to an additional ring such as a benzene, cyclohexene, or cyclohexane. Exemplary heterocyclic groups fused to an additional ring include, but are not limited to, benzoimidazolyl.

Exemplary amino (meth)acrylates (i.e., L in Formula II is oxy) include N,N-dialkylaminoalkyl(meth)acrylates such as, for example, N,N-dimethylaminoethylmethacrylate, N,N-dimethylaminoethylacrylate, N,N-diethylaminoethylmethacylate, N,N-diethylaminoethylacrylate, N,N-dimethylaminopropylmethacrylate, N,N-dimethylaminopropylacrylate, N-tert-butylaminopropylmethacrylate, N-tert-butylaminopropylacrylate and the like.

Exemplary amino (meth)acrylamides (i.e., L in Formula II is —NH—) include, for example, N-(3-aminopropyl)methacrylamide, N-(3-aminopropyl)acrylamide, N-[3-(dimethylamino)propyl]methacrylamide, N-(3-imidazolylpropyl)methacrylamide, N-(3-imidazolylpropyl)acrylamide, N-(2-imidazolylethyl)methacrylamide, N-(1,1-dimethyl-3-imidazoylpropyl)methacrylamide, N-(1,1-dimethyl-3-imidazoylpropyl)acrylamide, N-(3-benzoimidazolylpropyl)acrylamide, and N-(3-benzoimidazolylpropyl)methacrylamide.

Exemplary quaternary salts of the ionic monomers of Formula II include, but are not limited to, (meth)acrylamidoalkyltrimethylammonium salts (e.g., 3-methacrylamidopropyltrimethylammonium chloride and 3-acrylamidopropyltrimethylammonium chloride) and (meth)acryloxyalkyltrimethylammonium salts (e.g., 2-acryloxyethyltrimethylammonium chloride, 2-methacryloxyethyltrimethylammonium chloride, 3-methacryloxy-2-hydroxypropyltrimethylammonium chloride, 3-acryloxy-2-hydroxypropyltrimethylammonium chloride, and 2-acryloxyethyltrimethylammonium methyl sulfate).

Other grafting monomers that can provide positively charged groups to an ion exchange resin include the dialkylaminoalkylamine adducts of alkenylazlactones (e.g., 2-(diethylamino)ethylamine, (2-aminoethyl)trimethylammonium chloride, and 3-(dimethylamino)propylamine adducts of vinyldimethylazlactone) and diallylamine monomers (e.g., diallylammonium chloride and diallyldimethylammonium chloride).

As described in further detail below, functionalized substrates of the present invention may be prepared using one of the above-described grafting monomers or a mixture of two or more of the above-described grafting monomers to alter the surface properties of a porous base substrate. When two or more of the above-described grafting monomers are used to alter the surface properties of a porous base substrate, the monomers may be grafted onto the porous base substrate in a single reaction step (i.e., the two or more grafting monomers are all present upon exposure to an electron beam) or in sequential reaction steps (i.e., a first grafting monomer is present upon a first exposure to an electron beam and a second grafting monomer is present upon a second exposure to the electron beam).

3. Reactants Bonded to Functional Groups on Grafted Species

As discussed above, a functional group along the grafted species extending from the porous base substrate can be reacted with one or more other reactants. That is, a functional group such as an ethylenically unsaturated group, epoxy group, azlactone group, or isocyanato group can react with a monomer or nucleophilic compound to further modify the surface of the functionalized substrate. Any monomer that can react with the grafted species can be used. The nucleophilic compound, for example, can have groups that alter the hydrophilic or hydrophobic character of the functionalized substrate, that provide other desired functional groups, or that alter the ionic character of the functionalized substrate.

In some embodiments, the grafted species can impart a hydrophilic character to the functionalized substrate that contains a porous base substrate that has a hydrophobic character prior to surface modification. The hydrophilic character of the functionalized substrate can result from the reaction of the porous base substrate with the grafting monomer upon exposure to an electron beam or can result from reaction of the grafted species with other reactants. The grafted species often contains a hydrophilic group. Suitable groups capable of imparting a hydrophilic character include, for example, polyalkylene oxide groups, (meth)acryloly groups, ionic groups, and nucleophilic groups such as hydroxy, amino groups, and carboxy groups.

B. Functionalized Substrate Properties and Structural Characteristics

The functionalized substrates of the present invention have a variety of surface properties and structural characteristics depending on a number of factors including, but not limited to, the porous base substrate, the method of forming the porous base substrate, the species grafted onto interstitial and outer surfaces of the porous base substrate, any post-grafting treatments (e.g., a heating step) administered to the functionalized substrate, and any post-grafting reactions (e.g., reactions of the additional function group of the grafted species with a compound such as a nucleophilic compound or a compound with an ionic group). A number of properties and characteristics of the functionalized substrate are described below.

1. Increased Pore Size

In some embodiments of the present invention, the functionalized substrate has an average final pore size greater than an average initial pore size of the porous base substrate prior to a surface modification step (e.g., prior to attachment of the grafted species or reaction of a functional group on the grafted species with another compound such as a monomer or nucleophilic compound). In one exemplary embodiment demonstrating increased pore size, the functionalized substrate comprises (i) a porous base substrate (e.g., a microporous base substrate such as a microporous membrane) having interstitial and outer surfaces, wherein the porous base substrate has an average initial pore size prior to a grafting step; and (ii) grafted species extending from the interstitial and outer surfaces, wherein the functionalized substrate has an average final pore size, and the average final pore size of the functionalized substrate is greater than the average initial pore size of the porous base substrate. In this embodiment, the functionalized substrate desirably comprises a porous base substrate that is microporous membrane.

The increase in pore size enables the functionalized substrates to have a different utility compared to the porous base substrate before addition of the grafted species. For example, flux or flow rate through the functionalized substrate can be greater, which enables good permeability of the functionalized substrate while maintaining relatively low operating pressures when the functionalized substrate is used in filtration applications. Further, the increased pore size of the functionalized substrate compared to the porous base substrate allows the application of an additional coating onto the interstitial and outer surfaces of the functionalized substrate while maintaining open pores throughout the functionalized substrate. Such additional coatings may be used to add further functionality to the functionalized substrates.

In one desired embodiment, the functionalized substrate having increased pore size comprises a TIPS microporous membrane such as a TIPS membrane formed from a polymeric material such as PVDF. Prior to the present invention, known TIPS membranes formed by known TIPS membrane formation processes resulted in membranes having an average pore size of less than about 1.0 microns. Using prior art methods, it can be difficult to prepare a TIPS membrane having a relatively uniform average pore size of 1.0 microns or greater. The present invention, however, enables membranes formed via a TIPS process to have an average pore size greater than 1.0 microns, and in some embodiments up to about 1.2 microns or larger.

The average initial pore size for a microporous membrane formed via a TIPS process often ranges from about 0.6 to about 0.9 microns. The average initial pore size of these microporous membranes may be increased in the present invention to an average final pore size ranging from about 0.7 to about 1.2 microns. In other words, the average initial pore size may be increased as much as about 0.1 microns (about 0.2 microns, about 0.3 microns, about 0.4 microns, about 0.5 microns, or even about 0.6 microns). The average initial pore size may be increased as much as about 17%. For example, the average initial pore size may be increased as much as about 20%, about 30%, about 40%, about 50%, about 60%, or about 70%.

2. Increased Water Flux Rates

The functionalized substrates of the present invention desirably have a water flux rate that is greater than zero. Typically, the water flux rate of the functionalized substrate is greater than the initial water flux rate of the base porous base substrate prior to a grafting step. In some embodiments, the water flux rate of the functionalized substrate is much greater, for example, as much as 2 times greater than the initial water flux rate of the porous base substrate prior to a grafting step.

One method of measuring the water flux rate of a given functionalized substrate or porous base substrate is to measure the amount of time necessary for a quantity of water to flow through the functionalized substrate or porous base substrate at a constant temperature and pressure. A decrease in the amount of time necessary for a quantity of water at a constant temperature and pressure to flow through a given functionalized substrate compared to the corresponding porous base substrate prior to surface modification indicates an increase in the water flux rate of the functionalized substrate.

In some embodiments, the functionalized substrates of the present invention can experience an increase in water flux rate of as much as about 25 to about 100% compared to the water flux rate of the porous base substrate prior to a grafting step (i.e., prior to surface modification). (For example, see Comparative Example 6 and Examples 30-31 below.)

3. Wettability

The functionalized substrates of the present invention can exhibit various degrees of wettability upon exposure to various solutions or solvents. Wettability can often be correlated to the hydrophilic or hydrophobic character of the functionalized substrate. Table 1 below provides data relating to the effect of a 20 hour exposure to NaOH solutions (i.e., 0.25N and 1N NaOH solutions) on several functionalized substrates and a porous base substrate. As used herein, the term "instant wet" or "instant wettability" refers to the penetration of droplets of water into a given substrate as soon as the water contacts the substrate surface, typically within less than 1 second. For example, a surface wetting energy of about 72 dynes or larger usually results in instant wetting. As used herein, the term "no instant wet" refers to penetration of droplets of water into a given substrate but not as soon as the water contacts the substrate surface. As used herein, the term "no wetting" refers to the lack of penetration of droplets of water into a given substrate. For example, a surface wetting energy of about 60 dynes or less usually results in no wetting.

TABLE 1

Sodium Hydroxide Exposure Test ("Instant Wettability" Test)

| | SR-603 PEG 400 di- methacrylate 20 wt % on TIPS "A" membrane 40 kGy | SR-603 PEG 400 dimethacrylate 20 wt % on DURAPORE HVHP14250 membrane 40 kGy | DURAPORE HVLP14250 (hydrophilic) membrane | SR-344 PEG 400 diacrylate 10 wt % on TIPS "A" membrane 40 kGy |
|---|---|---|---|---|
| 1N NaOH 20 hours | instant wet | instant wet | no instant wet | no wetting |
| 0.25N NaOH 20 hours | instant wet | instant wet | instant wet | instant wet |

Table 1 shows data for a functionalized substrates prepared using a PVDF membrane as the porous base substrate. These porous base substrates were either a TIPS membrane (see description of TIPS "A" film in Example section) or a membrane commercially available from Millipore Corporation (Billerica, Mass.) under the trade designation DURAPORE and that was hydrophobic as purchased. Polyethylene glycol (400) dimethacrylate monomer (from a 20 wt % solution in methanol, Sartomer SR-603 commercially available from Sartomer Company, Inc. (Exton, Pa.)) was grafted onto the porous base substrates upon exposure to an electron beam at a dose of 40 kGy. The resulting functionalized substrates retain instant wettability when exposed to a 0.25 N NaOH solution for 20 hours or a 1 N NaOH solution for 20 hours.

For comparison, another DURAPORE membrane, which is hydrophilic as purchased and that was not surface modified (this corresponds to a hydrophilic porous substrate), had instant wettability when exposed to a 0.25 N NaOH solution for 20 hours but had no instant wettability when exposed to a 1 N NaOH solution for 20 hours. Further, for comparison, a functionalized substrate was prepared by exposing polyethylene glycol (400) diacrylate monomer (from a 10 wt % solution in methanol, Sartomer SR-344 commercially available from Sartomer Company, Inc. (Exton, Pa.)) and a microporous PVDF TIPS membrane to an electron beam at a dose of 40 kGy. The resulting functionalized substrate retained instant wettability when exposed to a 0.25 N NaOH solution for 20 hours, but did not exhibit any wetting when exposed to a 1 N NaOH solution for 20 hours.

4. Resistance to Heat

The functionalized substrates also exhibit resistance to multiple exposures to heat. For example, Table 2 below provides data relating to the effect of simple durability tests followed by multiple one hour oven exposures to a temperature of 121° C. on an exemplary functionalized substrate prepared by exposing a TIPS membrane and polyethylene glycol (400) dimethacrylate monomer (from a 20 wt % solution in methanol) to an electron beam at a dose of 40 kGy.

TABLE 2

Heat and Caustic Exposure Test

| Step | Procedure | SR-603 PEG 400 dimethacrylate 40 kGy, 20 wt % on TIPS "A" membrane Seconds: | DURAPORE ® HVLP14250 membrane without E-beam grafting Seconds: |
|---|---|---|---|
| — | Initial Flux Time (sec.) | 18.2 | 15.1 |
| 1 | 100 ml IPA flush | 18.1 | 15.2 |
| 2 | 1 hour 121° C. | 14.5 | 14.5 |
| 3 | 16 hours 0.25 N NaOH soak | wets | wets |
| 4 | 1 hour 121° C. | 18.5 | 26.9 |
| 5 | 1 hour 121° C. | 16.1 | 38.2 |
| 6 | 1 hour 121° C. | 15.3 | 51.6 |
| 7 | 1 hour 121° C. | 16.0 | 61.4 |
| 8 | 1 hour 121° C. | 15.3 | 96.4 |
| 9 | 1 hour 121° C. | 14.5 | 108.9 |
| 10 | 1 hour 121° C. | 14.0 | 164.8 |
| 11 | 1 hour 121° C. | 14.6 | 154.3 |

The water flux time is equal to the amount of time needed for 100 ml of water to pass through a 47 mm Gelman Sciences (now known as Pall Corporation (Ann Arbor, Mich.)) 4238 disk holder at 533 mm Hg (21 inches Hg). As shown in Table 2, the functionalized substrate retained a water flux time substantially equal to or less than an initial flux time after multiple heat cycles and exposure to a 0.25 N NaOH solution for 16 hours. In comparison, the water flux time of an unmodified hydrophilic microporous PVDF DURAPORE® membrane exposed to the same series of steps showed a substantial increase in the water flux time (i.e., a substantial decrease in the water flux rate through the substrate).

II. Method of Making Functionalized Substrates

The above-described functionalized substrates may be prepared using a combination of process steps. The method comprises the steps of providing a porous base substrate having interstitial and outer surfaces; imbibing the porous base substrate with a first solution to form an imbibed porous base substrate, the first solution comprising at least one grafting monomer having (a) a free-radically polymerizable group and (b) an additional functional group comprising an ethylenically unsaturated group, an epoxy group, an azlactone group, an ionic group, an alkylene oxide group, or combination thereof, and exposing the imbibed porous base substrate to a controlled amount of electron beam radiation so as to form a first functionalized substrate comprising grafted species attached to the surfaces of the porous base substrate, wherein at least one of the grafted species comprises the additional functional group. Some of the porous base substrates used in this embodiment can be hydrophobic, microporous, or a combination thereof.

In one embodiment, the method comprises the steps of providing a porous base substrate having interstitial and outer surfaces; imbibing the porous base substrate with a first solution to form an imbibed porous base substrate, the first solution comprising at least one grafting monomer having (a) a free-radically polymerizable group and (b) an additional functional group comprising an ethylenically unsaturated group, an epoxy group, an azlactone group, an ionic group, an alkylene oxide group, or combination thereof, positioning the imbibed porous base substrate between a removable carrier layer and a removable cover layer to form a multilayer structure; exposing the multilayer structure to a controlled amount of electron beam radiation so as to form a functionalized substrate positioned between the removable carrier layer and the removable cover layer, the functionalized substrate comprising grafted species attached to the surfaces of the porous base substrate, wherein at least one of the grafted species comprises the additional functional group; and removing the carrier layer and cover layers from the multilayer structure. Some of the porous base substrates used in this embodiment can be hydrophobic, microporous, or a combination thereof.

One exemplary method for making functionalized substrates is depicted in FIG. 1. As shown in FIG. 1, exemplary method 10 comprises the following steps: an imbibing step 100, a sandwiching step 200, an irradiation step 300, a peeling step 400, a wash/rinse step 500, a drying step 600, and a take-up step 700. Each of these exemplary steps is described in further detail below.

A. Exemplary Process Steps

Methods of making functionalized substrates of the present invention may comprise one or more of the following steps.

1. Imbibing Step

As shown in FIG. 1, a roll 11 comprising a base porous base substrate 12 may be unwound so that base porous base substrate 12 enters into imbibing step 100. In imbibing step 100, base porous base substrate 12 is brought into contact or into proximity with applicator 14 that is connected to a reservoir of solution 13 containing one or more grafting monomers. Rollers 15 and 16 guide base porous base substrate 12 past applicator 14 so that base porous base substrate 12 is exposed to solution 13 for a desired amount of time. Typically, the exposure time of the base porous base substrate 12 to solution 13 is up to about 1.0 minutes, more typically, less than about 15 seconds. Base porous base substrate 12 usually proceeds through imbibing step 100 and to irradiation step 300 in less than 1 minute. In some imbibing steps, the porous base substrate 12 is saturated with the solution 13.

As discussed above, solution 13 may comprise one or more grafting monomers suitable for grafting onto interstitial and outer surfaces of base porous base substrate 12. Any of the exemplary grafting monomers described above can be included in solution 13. In addition to grafting monomers, solution 13 can contain other materials such as, for example, solvents. The concentration of each grafting monomer in solution 13 may vary depending on a number of factors including, but not limited to, the grafting monomer or monomers in solution 13, the extent of grafting desired, the reactivity of the grafting monomer(s), and the solvent used. Typically, the concentration of each grafting monomer in solution 13 ranges from about 1 wt % to about 100 wt %, desirably, from about 5 wt % to about 30 wt %, and more desirably from about 10 wt % to about 20 wt % based on a total weight of solution 13.

Once base porous base substrate 12 has been imbibed in solution 13 for a desired period of time, the base porous base substrate 12 is directed toward sandwiching step 200 via guide roller 17. Guide roller 17 may be used to meter excess solution 13 from the imbibed base porous base substrate 12 if so desired. Alternately, rollers (not shown) could be used to squeeze air bubbles and excess solution 13 from the imbibed base porous base substrate 12. Typically, base porous base substrate 12 enters sandwiching step 200 in a substantially saturated condition (i.e., base porous base substrate 12 contains a maximum amount of solution 13 or close to a maximum amount) wherein substantially all of the interstitial and outer surfaces of base porous base substrate 12 are coated with solution 13.

It should be noted that imbibing step 100 is only one possible method of introducing solution 13 into base porous base substrate 12. Other suitable methods include, but are not limited to, a spray coating method, flood coating method, knife coating, etc.

2. Sandwiching Step

In sandwiching step 200, imbibed base porous base substrate 12 is sandwiched (i.e., positioned) between a removable carrier layer 22 and a removable cover layer 19 to form multilayer sandwich structure 24. As shown in exemplary method 10, removable cover layer 19 may be unwound from roll 18 and brought into contact with an outer surface of imbibed base porous base substrate 12 via roller 20, while removable carrier layer 22 may be unwound from roll 21 and brought into contact with an opposite outer surface of imbibed base porous base substrate 12 via roller 23.

Removable cover layer 19 and removable carrier layer 22 may comprise any inert sheet material that is capable of providing temporary protection to functionalized substrate 30 (i.e., grafted base porous base substrate 12) from direct exposure to oxygen upon exiting chamber 25. Suitable inert sheet materials for forming removable cover layer 19 and removable carrier layer 22 include, but are not limited to, polyethylene terephthalate film material, other aromatic polymer film materials, and any other non-reactive polymer film material. Once assembled, multilayer sandwich structure 24 proceeds to irradiation step 300.

3. Irradiation Step

In irradiation step 300, multilayer sandwich structure 24 is exposed to a sufficient quantity of radiation so as to graft one or more monomers within solution 13 onto interstitial and outer surfaces of base porous base substrate 12 so as to form multilayer sandwich structure 27 comprising functionalized substrate 30 sandwiched between removable carrier layer 22 and removable cover layer 19. As shown in exemplary method 10, multilayer sandwich structure 24 proceeds through chamber 25, which contains at least one device 26 capable of providing a sufficient dose of radiation. A single device 26 is capable of providing a sufficient dose of radiation, although two or more devices 26 may be used especially for relatively thick base porous base substrates 12. Typically, chamber 25 comprises an inert atmosphere such as nitrogen, carbon dioxide, helium, argon, etc. with a minimal amount of oxygen, which is known to inhibit free-radical polymerization. In embodiments wherein base porous base substrate 12 is irradiated without removable cover layer 19, the amount of oxygen within chamber 25 can be more of a concern. When removable carrier layer 22 and removable cover layer 19 cover the base porous base substrate 12, exposure to oxygen within chamber 25 is minimal.

Although other sources of irradiation may be used, desirably device 26 comprises an electron beam source. Electron beams (e-beams) are generally produced by applying high voltage to tungsten wire filaments retained between a repeller plate and an extractor grid within a vacuum chamber maintained at about $10^{-6}$ Torr. The filaments are heated at high current to produce electrons. The electrons are guided and accelerated by the repeller plate and extractor grid towards a thin window of metal foil. The accelerated electrons, traveling at speeds in excess of $10^7$ meters/second (m/sec) and possessing about 150 to 300 kilo-electron volts (keV), pass out of the vacuum chamber through the foil window and penetrate whatever material is positioned immediately beyond the foil window.

The quantity of electrons generated is directly related to the extractor grid voltage. As extractor grid voltage is increased, the quantities of electrons drawn from the tungsten wire filaments increase. E-beam processing can be extremely precise when under computer control, such that an exact dose and dose rate of electrons can be directed against multilayer sandwich structure 24.

Electron beam generators are commercially available from a variety of sources, including the ESI "ELECTROCURE" EB SYSTEM from Energy Sciences, Inc. (Wilmington, Mass.), and the BROADBEAM EB PROCESSOR from PCT Engineered Systems, LLC (Davenport, Iowa). For any given piece of equipment and irradiation sample location, the dosage delivered can be measured in accordance with ASTM E-1275 entitled "Practice for Use of a Radiochromic Film Dosimetry System." By altering extractor grid voltage, beam diameter and/or distance to the source, various dose rates can be obtained.

The temperature within chamber 25 is desirably maintained at an ambient temperature by conventional means. Without intending to be limited to any particular mechanism, it is believed that the exposure of the imbibed porous base substrate to an electron beam results in free radical initiation on the substrate which can then react with monomers having a double bond such as monomers having an ethylenically unsaturated group.

The total dose received by multilayer sandwich structure 24 primarily affects the extent to which the grafting monomer is grafted onto the porous base substrate. In general, it is desirable and typical to convert at least 10 wt %, desirably 20 wt %, even more desirably greater than 50 wt % of the grafting monomers added during the imbibing step to grafted species. Further, it is desirable and typical to graft as much as about 5 wt %, desirably as much as about 10 wt %, more desirably as much as about 20 wt % (or as much as about 100 wt %) of one or more grafting monomers added during the imbibing step onto base porous base substrate 12, based on a total weight of base porous base substrate 12. Dose is dependent upon a number of processing parameters, including voltage, speed and beam current. Dose can be conveniently regulated by controlling line speed (i.e., the speed with which multilayer sandwich structure 24 passes under device 26), and the current supplied to the extractor grid. A target dose (e.g., 20 kGy) can be conveniently calculated by multiplying an experimentally measured coefficient (a machine constant) by the beam current and dividing by the web speed to determine the exposure. The machine constant varies as a function of beam voltage.

While the controlled amount of electron beam radiation exposure is dependent upon the residence time, as a general matter, the monomers imbibed on the porous base substrate 12 that is part of multilayer sandwich structure 24 will generally be significantly grafted upon receiving a controlled amount of dosage ranging from a minimum dosage of about 10 kilograys (kGy) to a maximum dosage of about 60 kGy. Typically, the total controlled amount of dosage ranges from about 20 kGy to about 40 kGy. While low dose rates and longer residence times are preferred for radiation grafting, practical operation may necessitate speeds that force higher dose rates and shorter residence. Exclusion of oxygen in a multilayer sandwich allows free radical chemistry to continue after E-beam exposure for a duration sufficient to improve the grafting yield.

4. Peeling Step

Upon exiting chamber 25, multilayer sandwich structure 27 proceeds toward peeling step 400. In peeling step 400, multilayer sandwich structure 27 is disassembled by separating removable carrier layer 22 and removable cover layer 19 from functionalized substrate 30. As shown in exemplary method 10, removable cover layer 19 is separated from an outer surface of functionalized substrate 30 and taken-up as roll 28, while removable carrier layer 22 is separated from an opposite outer surface of functionalized substrate 30 and taken-up as roll 29.

In one desired embodiment, after exposure to an electron beam and exiting chamber 25, removable carrier layer 22 and removable cover layer 19 are allowed to remain on functionalized substrate 30 for a period of time prior to peeling step 400 so as to provide prolonged protection of functionalized substrate 30 from exposure to oxygen. Desirably, removable carrier layer 22 and removable cover layer 19 remain on functionalized substrate 30 for at least 15 seconds, more desirably, for about 30 to about 60 seconds after exiting chamber 25. However, there is no upper time limit that will reduce grafting quality and multilayer sandwich structure 27 can remain intact for an extended time period as would be the case if batch processing rolls of multilayer sandwich structure 27 are prepared. Once multilayer sandwich structure 27 is disassembled, functionalized substrate 30 can proceed to an optional washing/rinsing step 500.

5. Washing/Rinsing Step

In optional washing/rinsing step 500, functionalized substrate 30 is washed or rinsed one or more times in rinse chamber 31 to remove any unreacted monomers, solvent or other reaction by-products from functionalized substrate 30. Typically, functionalized substrate 30 is washed or rinsed up to three times using a water rinse, an alcohol rinse, a combination of water and alcohol rinses, and/or a solvent rinse (e.g., acetone, MEK, etc). When an alcohol rinse is used, the rinse may include one or more alcohols including, but not limited to, isopropanol, methanol, ethanol, or any other alcohol that is practical to use and an effective solvent for any residual monomer. In each rinse step, functionalized substrate 30 may pass through a rinse bath or a rinse spray.

6. Drying Step

In optional drying step 600, functionalized substrate 30 is dried to remove any rinse solution from functionalized substrate 30. Typically, functionalized substrate 30 is dried in oven 32 having a relatively low oven temperature for a desired period of time (referred to herein as "oven dwell time"). Oven temperatures typically range from about 60° C. to about 120° C., while oven dwell times typically range from about 120 to about 600 seconds.

Any conventional oven may be used in optional drying step 600 of the present invention. Suitable ovens include, but are not limited to, a convection oven.

It should also be noted that in other embodiments drying step 600 can proceed before washing/rinsing step 500 eliminating volatile components before extraction of non-grafted residue.

7. Take-Up Step

Following optional drying step 600, dried functionalized substrate 30 can be taken up in roll form as roll 33. Functionalized substrate 30 may be stored for future use in roll form, used immediately as is, or further processed to further alter the surface properties of functionalized substrate 30.

8. Further Processing

In one exemplary embodiment, functionalized substrate 30 is further processed to alter the surface properties of functionalized substrate 30. In this embodiment, functionalized substrate 30 is processed through a grafting process such as exemplary method 10 for a second time (or even more times) in order to (i) graft additional grafting monomers onto interstitial and outer surfaces of functionalized substrate 30, (ii) graft additional monomers onto grafted species extending from interstitial and outer surfaces of functionalized substrate 30, or (iii) both (i) and (ii). For example, in one exemplary embodiment, functionalized substrate 30 is prepared by imbibing a porous base substrate with a first solution comprising one or more grafting monomers in a solvent, wherein the one or more grafting monomers comprise at least one grafting monomer having (a) a free-radically polymerizable group and (b) at least one additional functional group thereon (e.g., an ethylenically unsaturated group, an epoxy group, an azlactone group, an isocyanato group, an ionic group, an alkylene oxide group, or combination thereof); and then exposing the porous base substrate imbibed with the first solution to a controlled amount of electron beam radiation so as to graft the one or more grafting monomers to interstitial and outer surfaces of the porous base substrate. The resulting first functionalized substrate is rinsed to remove any unreacted grafting monomer, and then subsequently imbibed with a second solution comprising one or more grafting monomers in a solvent, wherein the one or more grafting monomers comprise at least one grafting monomer having (a) a free-radically polymerizable group and (b) at least one additional functional group thereof such as an ethylenically unsaturated group, epoxy group, azlactone group, isocyanato group, ionic group, an alkylene oxide group, or combination thereof, and then exposing the first functionalized substrate imbibed with the second solution to a controlled amount of electron beam radiation to form a second functionalized substrate. The further modified functionalized substrate 30 can then proceed through an optional washing/rinsing step, such as exemplary washing/rinsing step 500 in exemplary method 10, and an optional drying step, such as exemplary drying step 600 in exemplary method 10.

In a further exemplary embodiment, functionalized substrate 30 is further processed (e.g., after a single pass or numerous passes through a grafting process such as exemplary method 10) to further alter the surface properties of functionalized substrate 30 by passing functionalized substrate 30 through a process such as shown in exemplary method 50 in FIG. 2. In this embodiment, functionalized substrate 30 is brought into contact with a solution containing one or more reactants that can react with functional groups along grafted species of functionalized substrate 30. Although FIG. 2 shows the functionalized substrate 30 provided from roll 33, the process steps depicted in FIG. 2 can be performed in a continuous process with the process steps depicted in FIG. 1.

As shown in FIG. 2, exemplary method 50 starts by removing functionalized substrate 30 from roll 33, and guiding functionalized substrate 30 into imbibing step 100. In imbibing step 100, functionalized substrate 30 is brought into contact with a solution 13 containing one or more reactants. The reactants may be compounds that react with or interact with one or more functional groups (e.g., epoxy groups, ethylenically unsaturated groups, azlactone group, isocyanato groups, or ionic groups, alkylene oxide groups, or a combination thereof) along the grafted species of functionalized substrate 30. For example, a compound having a nucleophilic group can react with an azlactone group, isocyanato group, or epoxy group or a compound having a charged group can interact with an ionic group. Rollers 15 and 16 guide functionalized substrate 30 through solution 13 so that functionalized substrate 30 is in contact with solution 13 for a desired amount of time. Typically, the dwell time of functionalized substrate 30 in solution 13 is less than about 1.0 minutes.

The concentration of each reactant in solution 13 may vary depending on a number of factors including, but not limited to, the reactant or reactants in solution 13, the extent of surface modification desired, and the solvent used. Typically, the concentration of each reactant in solution 13 ranges from about 5 wt % to about 100 wt % based on a total weight of solution 13.

Once functionalized substrate 30 has been imbibed with solution 13 for a desired period of time, functionalized substrate 30 is directed toward an optional heating step 800 via guide roller 17. Guide roller 17 may be used to meter excess solution 13 from functionalized substrate 30 if so desired. Typically, functionalized substrate 30 enters optional heating step 800 in a substantially saturated condition (i.e., functionalized substrate 30 contains a maximum amount of solution 13 or close to a maximum amount).

Although not shown in FIG. 2, exemplary method 50 can include an optional step wherein functionalized substrate 30 imbibed with solution 13 is sandwiched between removable materials, such as removable carrier layer and removable cover layer comprising a non-reactive polymer film, such as PET, in order to prevent evaporation of chemicals and/or solvent carrier during heating step 800. The same removable materials described above can be used in this step. Use of removable covers can, at least in some embodiments, minimize VOC emissions and reduce flammability concerns. In this embodiment, a peeling step similar to peeling step 400 may follow heating step 800.

9. Heating Step

In optional heating step 800, functionalized substrate 30 is heated to facilitate the reaction between reactants added during the imbibing step 100 and one or more functional groups along grafted species of functionalized substrate 30 so as to produce further functionalized substrate 35. Typically, during the optional heating step 800, functionalized substrate 30 is subjected to an oven 36 having an oven temperature of up to about 120° C. depending on a number of factors including, but not limited to, the reactants, the base porous base substrate, the functional groups present on the grafted species, and the dwell time within oven 36. Typically, the oven temperature used in optional heating step 800 is 30° C. of greater (desirably, 40° C. or greater, 50° C. or greater, or 60° C. or greater). The oven temperature typically ranges from about 60° C. to about 120° C. Typically, oven dwell time in optional heating step 800 ranges from about 60 seconds to about 1 hour.

Any conventional oven may be used in the optional heating step of the present invention, such as optional heating step 800 of exemplary method 50. Suitable ovens include, but are not limited to, the above-described ovens used in optional drying step 600 of exemplary method 10. Desirably, the oven used in optional heating step 800 of exemplary method 50 comprises a circulating air oven.

Once further functionalized substrate 35 exits oven 36, functionalized substrate 35 may pass through an optional washing/rinsing step 500 and an optional drying step 600 as described above. Following optional drying step 600, dried functionalized substrate 35 can be taken up in roll form as roll 37. Further functionalized substrate 35 may be stored for future use in roll form, used immediately as is, or further processed in one or more additional process steps (not shown). Suitable additional process steps may include, but are not limited to, a reaction step or a coating step wherein a coating composition is applied to further functionalized substrate 35, a lamination step wherein one or more additional layers are temporarily or permanently joined to further functionalized substrate 35, an assembling step wherein further functionalized substrate 35 is combined with one or more additional components to form a finished product (e.g., a filter assembly), a packaging step wherein further functionalized substrate 35 or a finished product comprising further functionalized substrate 35 is packaged within a desired packaging material (e.g., a polyethylene film or bag), or any combination thereof.

B. Process Parameters

The methods of making functionalized substrates of the present invention may also be described by one or more process parameters including, but not limited to, the process parameters provided below.

1. Batch Versus Continuous Process

It should be noted that the methods of making functionalized substrates of the present invention may be performed using a continuous process, such as exemplary method 10 shown in FIG. 1, or alternatively, using a batch process wherein one or more of the above-described process steps are performed separate from one another. Desirably, the methods of making functionalized substrates are performed using a continuous process, such as exemplary method 10 shown in FIG. 1.

2. Line Tension

When using a continuous process, such as exemplary method 10, one or more drive rolls (not shown) may be used to move base porous base substrate 12 or functionalized substrate 30 through the continuous process. The one or more drive rolls provide sufficient tension on base porous base substrate 12 and functionalized substrate 30 to move base porous base substrate 12 and functionalized substrate 30 through a given apparatus. Care should be taken when determining the amount of tension to apply in order to prevent shrinkage and/or tearing of base porous base substrate 12 or functionalized substrate 30 during processing. If a stronger carrier web (e.g., removable carrier layer 22) is used to convey base porous base substrate 12 or functionalized substrate 30, then the tension load is easier to adjust without transmitting the tension load through the substrate itself.

In the exemplary continuous grafting process of the present invention, the one or more drive rolls typically operate in a range of 5 to 40 lbs (22 to 178 Newtons) of tension on a (12 inch) 30 cm wide web of base porous base substrate 12 or functionalized substrate 30 in order to move base porous base substrate 12 or functionalized substrate 30 through a given apparatus, resulting in a tension of 0.7 to 5.9 Newtons per lineal centimeter of base porous base substrate 12 or functionalized substrate 30. In one desired embodiment, the one or more drive rolls operate in a range of 1.4 to 3.0 Newtons per lineal centimeter of base porous base substrate 12 or functionalized substrate 30.

3. Line Speed

In the exemplary continuous grafting process of the present invention, the one or more drive rolls also provide a desired line speed through a given apparatus. Desirably, base porous base substrate 12 and functionalized substrate 30 move through a given apparatus at a line speed of at least about 1.52 meters/minute (mpm) (5 fpm). In one desired embodiment, base porous base substrate 12 and functionalized substrate 30 move through a given apparatus at a line speed ranging from about 3.05 mpm (10 fpm) to about 30.5 mpm (100 fpm).

C. Altered Properties of the Functionalized Substrates

The disclosed methods of making functionalized substrate may be used to prepare a variety of functionalized substrates. The functionalized substrates have at least one group selected from (i) an ethylenically unsaturated group, (ii) an epoxy group or a ring-opened epoxy linkage group, (iii) an azlactone group or a ring-opened azlactone linkage group, (iv) an isocyanato group, urethane linkage group, or urea linkage group, (v) an ionic group, (vi) an alkylene oxide group, or any combination of (i) to (vi). In some embodiments, the method of making a functionalized substrate can alter the properties of the porous base substrate.

In any of the above-described methods of making a functionalized substrate, any of the above-mentioned base porous base substrates, grafting monomers, and reactants may be used to form a given functionalized substrate. The base porous base substrate is often in the form of a porous membrane such as a microporous membrane, a nonwoven web, or porous fibers. In some embodiment, the base porous base substrate comprises a hydrophobic microporous membrane formed by a thermally-induced phase separation (TIPS) method.

1. Increased Average Pore Size

In some methods, the average pore size can be altered. The method comprises the steps of providing a porous base substrate having an average initial pore size; imbibing the porous base substrate with a first solution comprising at least one grafting monomer having (a) a free-radically polymerizable group and (b) at least one additional functional group thereon; exposing the porous base substrate to a controlled amount of electron beam radiation so as to graft the one or more grafting monomers to interstitial and outer surfaces of the porous base substrate; and exposing the grafted porous base substrate to a heat cycle at 30° C. or greater (desirably, 60° C. or greater), wherein the method results in a functionalized substrate having an average final pore size, wherein the average final pore size of the functionalized substrate is greater than the average initial pore size of the porous base substrate. In this embodiment, the porous base substrate is often a microporous membrane. For example, the microporous membrane can be hydrophobic microporous membrane such as a TIPS membrane.

In some of the above-described methods of increasing pore size, the average initial pore size of the microporous base substrate (prior to a grafting step) typically ranges from about 0.6 to about 0.9 microns, while the average final pore size of the grafted microporous base substrate typically ranges from about 0.7 to about 1.2 microns. Such increases in average pore size are particularly noticeable when the microporous membrane comprises a hydrophobic microporous membrane, and especially a hydrophobic microporous membrane formed by a thermally-induced phase separation (TIPS) method. For example, the microporous membrane can comprise PVDF that is prepared using the TIPS method.

The average pore size can be increased, for example, when a grafting monomer is used that has two free-radically polymerizable groups. Although not wishing to be bound by theory, the grafting of both of these groups to the porous base substrate may result in a stress on the surfaces of the substrate resulting in an increased pore size. The grafting monomer is often selected to provide a hydrophilic group. For example, the grafting monomer can be a polyalkylene glycol di(meth)acrylate.

In another example, the average pore size can also be increased by reacting a nucleophilic compound having a plurality of nucleophilic groups with functional groups on more than one grafted species resulting in the crosslinking of the grafted species. Although not wishing to be bound by theory, the crosslinking of the grafted species may result in stress on the surfaces of the substrate resulting in an increased pore size. The nucleophilic compound is often selected to provide a hydrophilic group. For example, a polyalkylene glycol diamine or polyalkylene glycol triamine can be used as the nucleophilic compound.

In yet other examples, the average pore size also can be increased using a combination of different types of grafting monomers. A first grafting monomer can include two free-radically polymerizable groups and a second grafting monomer can include a functional group that is an epoxy group, azlactone group, isocyanato group, or combination thereof. The second grafting monomer can then be reacted with a nucleophilic compound having a plurality of nucleophilic groups. The nucleophilic compound can react with more than one epoxy group, azlactone group, isocyanato group, or combinations thereof resulting in the crosslinking of multiple grafted species. The first and second grafting monomers can be included in the same imbibing solution and grafted at the same time or can be included in separate imbibing solutions and grafted in a sequential manner. The order of grafting of the monomers typically is not critical. At least one of the grafting monomers or the nucleophilic compound is often chosen to provide a hydrophilic group.

2. Hydrophilic/Hydrophobic Character

In other embodiments, the method of making a functionalized substrate alters the hydrophobic nature of the porous base substrate. For example, the grafted species can include a hydrophilic group. In other examples, the grafted species without a hydrophilic group can be reacted with a nucleophilic compound that contains a hydrophilic group. In still other examples, a first grafted species can include hydrophilic group and a second grafted species without a hydrophilic group can be reacted with a nucleophilic compound that contains a hydrophilic group.

In some methods of making a functionalized substrate, the grafting monomer contains two free-radically polymerizable groups as well as a hydrophilic group. For example, alkylene glycol di(meth)acrylates can be used as grafting monomers to impart a hydrophilic character to a hydrophobic porous base substrate. These grafting monomers have two (meth)acryl groups and a hydrophilic polyalkylene glycol (i.e., polyalkylene oxide) group. These same grafting monomers can be used to increase the average pore size of microporous membranes such as TIPS membranes.

When the functionalized substrate has grafted species that contains an epoxy group, an azlactone group, or an isocyanato group, the functionalized substrate can be further treated to react these functional groups with a nucleophilic compound having a plurality of nucleophilic groups to impart a hydrophilic character to a hydrophobic porous base substrate. Any unreacted nucleophilic groups will tend to contribute to a hydrophilic functionalized substrate. Some exemplary nucleophilic compounds contain a hydrophilic group such as a polyalkylene oxide group in addition to the nucleophilic group. For example, the nucleophilic compound such as polyalkylene glycol diamines and polyalkylene glycol triamines can include a plurality of amino groups.

The present invention enables the formation of functionalized substrates having many of the advantages of a hydrophobic porous bases substrate (e.g., a hydrophobic microporous membrane), but with permanent hydrophilicity on the surfaces of the functionalized substrate. The present invention eliminates many of the known problems associated with porous bases substrates formed from hydrophilic polymers including, but not limited to, hygroexpansive issues; brittleness without humidification problems; mechanical strength weakness; and poor solvent, caustic and/or acidic resistance.

The present invention also enables the formation of functionalized substrates having various degrees of hydrophilicity depending on the materials and steps used to form a given functionalized substrate. For example, a hydrophobic porous membrane may be made hydrophilic, and then subsequently treated to graft epoxy groups onto the hydrophilic porous membrane. The resulting hydrophilic porous membrane remains hydrophilic even though hydrophobic groups (e.g., epoxy groups) have been grafted thereon. The resulting hydrophilic porous membrane remains hydrophilic, and yet becomes more reactive due to the presence of epoxy groups thereon.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Unless otherwise noted, all solvents and reagents were or can be obtained from Sigma-Aldrich Corp., St. Louis, Mo. "TIPS "A" film" refers to a microporous poly(vinylidene fluoride) film having a thickness of approximately 0.051 millimeters (0.002 inch), a Gurley air flow value of approximately 7 seconds per 50 cubic centimeters of air, and an average pore size of approximately 0.7 micrometers. This film was produced as described in WO2005035641 with the following specifics. PVDF polymer pellets (SOLEF 1012, Solvay Solexis Co., Thorofare, N.J.) were introduced into the hopper of a 40 mm co-rotating twin-screw extruder at 5.8 kg/hr. The nucleating agent, Pigment Blue 60 (PB60, Chromophtal Blue A3R, Ciba Specialty Chemicals, Basel, Switzerland) in powder form, was premixed with the diluent, glyceryl triacetate (TRIACETIN, Eastman Chemical Co., Kingsport, Tenn.), so that the final concentration of nucleating agent was 0.25 wt %. This blend was fed into an injection port located in the fourth zone of an eight-zone 40 mm twin screw extruder and melt mixed with the PVDF to form a homogeneous solution where the overall blend ratio was 42.0/57.75/0.25, PVDF/TRIACETIN/PB 60. The twin screw extruder was operated at 150 RPM and at a decreasing temperature profile of 215° C. (zone 1) to 188° C. (zone 8). The melt was pumped through a double-chromed coat-hanger slot film die and cast onto a patterned chrome roll that was maintained at 52° C. to form a cast film at 4.1 meters/min. The film was fed continuously into a seven-tank water wash bath where the TRIACETIN was removed. The film was then fed continuously into a five-roll, machine-direction stretching device maintained at an increasing temperature profile of 60° C. to 82° C. and at a stretch ratio of approximately 1.7:1. The length stretched film was then fed continuously into an eight-zone, transverse-direction stretching device maintained at an increasing temperature profile of 99° C. to 132° C. and a stretch ratio of approximately 2.2:1. The film was slit to its final width and wound onto a core. The film was approximately 50 microns in thickness, had a Gurley air flow value of about 7 sec/50 $cm^3$ air, and had an average pore size of about 0.7 microns.

"TIPS "B" film" refers to a microporous poly(vinylidene fluoride) film having an average pore size of approximately 0.15 micrometers. TIPS "B" film was prepared using a method similar to that used to prepare TIPS A film.

"TIPS "C" film" refers to a microporous poly(propylene) film having an average pore size of approximately 0.6 micrometers. TIPS "C" film was prepared according to the methods of U.S. Pat. Nos. 4,726,989 and 5,120,594, each of which is assigned to 3M Company, St. Paul, Minn., and each of which is hereby incorporated by reference in its entirety.

"TIPS "D" film" refers to a microporous poly(ethylene) film having an average pore size of approximately 0.6 micrometers. TIPS "D" film was prepared according to the methods of U.S. Pat. Nos. 4,726,989 and 5,120,594, each of which is assigned to 3M Company, St. Paul, Minn., and each of which is hereby incorporated by reference in its entirety.

"EVOH film" refers to a microporous poly(vinyl alcohol-co-ethylene) film of 68 mole percent vinyl alcohol and 32 mole percent ethylene prepared according to U.S. Pat. No. 5,962,544, which is assigned to 3M Company, St. Paul, Minn. and is hereby incorporated by reference.

"MEK" refers to methyl ethyl ketone.

"GMA" refers to glycidyl methacrylate.

"PVDF" refers to poly(vinylidene fluoride).

"JEFFAMINE XTJ-504" refers to JEFFAMINE XTJ-504, a polyether diamine available from Huntsman Corp., Houston, Tex.

"JEFFAMINE T-5000" refers to JEFFAMINE T-5000, a polyether triamine available from Huntsman Corp., Houston, Tex.

"DETA" refers to diethylenetriamine.

"SR344" refers to a polyethylene glycol diacrylate with an average molecular weight of about 400 g/mole that was obtained from Sartomer Co., Inc., Exton, Pa.

"SR603" refers to a polyethylene glycol dimethacrylate with an average molecular weight of about 400 g/mole that was obtained from Sartomer Co., Inc., Exton, Pa.

"CD553" refers to a polyethylene glycol acrylate obtained from Sartomer Co., Inc., Exton, Pa.

"APTAC" refers to 3-acrylamidopropyltrimethylammonium chloride.

"AMPS" refers to sodium 2-acrylamido-2-methyl-1-propanesulfonate.

"AETAC" refers to [2-(acryloyloxy)ethyl]trimethylammonium chloride.

"DURAPORE "A" film" refers to a hydrophilic film available under the trade designation DURAPORE HVLP 14250 from Millipore Corp., Billerica, Mass.

"DURAPORE "B" film" refers to a hydrophobic film available under the trade designation DURAPORE HVHP 14250 from Millipore Corp., Billerica, Mass.

"PEG" refers to polyethylene glycol.

"PES "A" film" refers to a MILIPORE EXPRESS MEMBRANE GPWP1 polyethersulfone membrane, available from Millipore Corp., Billerica, Mass.

"PES "B" film" refers to SUPOR 200 polyethersulfone membrane, available from Pall Corp., East Hills, N.Y.

"NYLAFLO film" refers to a hydrophilic NYLON membrane having a pore size rating of 0.45 micrometers, available from Pall Corp., East Hills, N.Y.

Electron Beam Processing

Electron beam irradiation was carried out using a Model CB-300 electron beam system, obtained from Energy Sciences, Inc., Wilmington, Mass. The film samples were placed between two sheets of poly(ethylene terephthalate) film for the irradiation. The following procedure was used unless otherwise specified. Samples of film were placed between two larger area size pieces of 3-mil thick PET and taped together at one end. This sandwich was then opened and the sample film was wetted with monomer solution and the sandwich re-closed. Trapped air bubbles were removed and excess liquid was squeezed out by gently applying a rubber roller over the surface of the sandwich. The sandwich was taped to a moving web of PET and conveyed through the electron beam processor at a speed of 6.1 meters per minute (mpm) (20 fpm) and at a voltage of 300 keV with sufficient beam current applied to the cathode to deliver the targeted dose. The beam was calibrated using thin film dosimeters, calibrated and traceable to a national standards laboratory (RISO, Denmark). In some cases, to lower the overall dose rate and increase residence time while under the beam, the dose was fractionated by multiple passes through the beam to simulate a longer exposure time more characteristic of electron beams with cathodes extended in the web direction (i.e. BroadBeam, etc).

After the sample passed through the beam, the sandwich was removed from the web and allowed to sit for a minute or more before being opened, the sample removed and allowed to soak in a tray of water. The water in the tray was changed three times. The sample was then blotted with paper towels and allowed to air dry. Residual monomers not easily removed with water were extracted by washing with MEK, alcohol or other suitable solvent as specified in the examples.

Water Flux Test

Water flux was determined by placing a disk of the test film having a diameter of approximately 47 millimeters (mm) (1.85 inches) in a Model 4238 Pall Gelman magnetic filter holder (available from Pall Corp., East Hills, N.Y.). The filter holder was then placed on a filter flask that was attached to a vacuum pump. A vacuum gauge was used to monitor the vacuum. Approximately 150 milliliters (ml) of water was placed in the filter holder and then vacuum was applied. After approximately 50 ml of water passed through the film (the vacuum gauge at this time indicated approximately 533 mm of mercury (approximately 21 inches of mercury), timing was commenced using a stopwatch. When all of the remaining water had passed through the film, timing was stopped. The water flux was the time, measured in seconds, that elapsed for 100 ml of water to pass through the membrane under a vacuum of 0.83 mm of mercury.

Average Pore Diameter

The average pore diameter was determined by allowing a wetting liquid to spontaneously fill the pores in the sample membrane and then using a non-reacting gas to displace the liquid from the pores of the membrane. The gas pressure and flow rates are accurately measured using an Automated Capillary Flow Porometer, model number APP-1200-AEX with supplied software, Capwin version 6.71.54 from Porous Materials Inc. (PMI) of Ithaca N.Y. Fluorinert FC-43, available from 3M, was used as the wetting fluid and compressed nitrogen gas was used for displacement with a maximum pressure setting of 689.5 kilonewtons/$m^2$ (kN/$m^2$) (100 psi). The tests were run in the wet up/dry down software configuration.

Preparative Example 1

Preparation of PVDF Non-woven Film

A melt-blown PVDF microfiber nonwoven web was prepared using a method and equipment similar to that described in Van A. Wente, "Superfine Thermoplastic Fibers," *Industrial Engineering Chemistry*, vol. 48, pp. 1342-1346 (August, 1956) and Van A. Wente et al., "Manufacture of Super Fine Organic Fibers", Report No. 4364 of the Naval Research Laboratories, published May 25, 1954.

PVDF polymer pellets (SOLEF 1012, Solvay Solexis Co., Thorofare, N.J.) were used to produce meltblown webs utilizing a melt temperature of 234° C. and a mass flow rate of 0.35 g/hole/minute. Hot air, delivered at a rate equivalent to 4.5 cubic meters of air at 0° C. at 101.3 kN/$m^2$ (1 atmosphere) per meter of die face per minute and heated to 360 degrees C., was used to attenuate the fibers. The fibers were collected 15 centimeters (cm) from the die face utilizing a perforated drum collector to produce a web. The sample produced had an effective fiber diameter of 12.3 microns (μm). The web had a basis weight of about 50 grams per square meter (gsm) and a thickness of 0.13 cm. The effective fiber diameter was calculated according to the method set forth in Davies, C. N., "The Separation of Airborne Dust and Particles," Institution of Mechanical Engineers, London, Proceedings 1B, 1952.

Preparative Example 2

Preparation of EVOH Non-woven Film

A melt-blown EVOH microfiber nonwoven web was prepared using the method and equipment described in Preparative Example 1. EVOH polymer pellets (Poval C109B, Kuraray America Inc., 600 Lexington Ave., New York, N.Y.) were used to produce meltblown webs utilizing a melt temperature of 240° C. and a mass flow rate of 0.35 g/hole/minute. Hot air, delivered at a rate equivalent to 4.5 cubic meters of air at 0° C. at 101.3 kN/m$^2$ (1 atmosphere) per meter of die face per minute and heated to 285° C., was used to attenuate the fibers. The fibers were collected 17 cm from the die face utilizing a perforated drum collector to produce a web. The sample produced had an effective fiber diameter of 35 μm. The web had a basis weight of about 150 gsm and a thickness of 0.21 cm. The web was then calendered between two 25 cm diameter smooth chrome steel rolls (70° C.) running at 1.5 mpm with a nip pressure between the rolls of 18 kilograms-force per lineal centimeter. The resulting thickness of the web was 0.05 cm.

Comparative Example 1

A sample of TIPS "A" film was saturated with JEFFAMINE XTJ-504 and was then placed in a glass vial and capped. The vial was then heated to a temperature of 60° C. for one hour. The vial was allowed to cool to room temperature, after which time the film sample was removed and was rinsed twice with methanol. The rinsed film sample was allowed to dry at room temperature. When a drop of water was placed on the film sample, the drop was observed not to be absorbed by the film.

Example 1-3

Three samples of TIPS "A" film each were weighed and were then saturated with a 20 weight percent solution of GMA in methanol and each were irradiated with an electron beam dose of 40 kilograys (kGy). The samples were then extracted with MEK and were allowed to dry at room temperature. Each sample was then weighed again. The films of Examples 1-3 were found to have increased in weight by 18.6%, 19.0%, and 20.5%, respectively. None of these samples were water absorbent. Each of the three films was then saturated with JEFFAMINE XTJ-504 and each film was then placed in a glass vial and capped. The three vials containing the films were heated to a temperature of 60° C. for one hour. The vials were allowed to cool to room temperature, after which time the film samples were removed and were rinsed twice with methanol. The rinsed film samples were then allowed to dry at room temperature and were again weighed. The film samples of Examples 1-3 were found to have increased in weight by about 12%. Each film sample was changed from blue to grey after the treatment. When drops of water were placed on each of the film samples, the drops were observed to be rapidly (e.g., nearly instantly) absorbed by the film samples.

Example 4

A sample of TIPS "A" film was saturated with a 10 weight percent solution of SR344 in methanol and was then irradiated with an electron beam dose of 20 kilograys (kGy) as previously described. The film sample was then saturated with a 20 weight percent solution of GMA in methanol and was again irradiated with an electron beam dose of 20 kilograys (kGy). The sample was then extracted with MEK and then with water and was allowed to dry at room temperature. A portion of the sample was then saturated with JEFFAMINE XTJ-504 and the film was then placed in a glass vial and capped. The vial containing the film was heated to a temperature of 60° C. for 45 minutes. The vial was allowed to cool to room temperature, after which time the film sample was removed and was rinsed twice with methanol. The rinsed film sample was then allowed to dry at room temperature. The average pore size of the film sample was evaluated as described above and was found to be larger than that of the starting TIPS "A" film.

Example 5

A sample of TIPS "A" film was saturated with a 10 weight percent solution of SR344 in methanol and was then irradiated with an electron beam dose of 20 kilograys (kGy) as previously described. This sample portion was evaluated as described above and the average pore size was found to be centered at approximately 0.9 micrometers The film sample was then saturated with a 20 weight percent solution of GMA in methanol and was irradiated with an electron beam dose of 40 kilograys (kGy). The sample was then extracted with MEK and then with water and was allowed to dry at room temperature. A portion of the sample was then saturated with JEFFAMINE XTJ-504 and the film was then placed in a glass vial and capped. The vial containing the saturated film was heated to a temperature of 60° C. for 45 minutes. The vial was allowed to cool to room temperature, after which time the film sample was removed and was rinsed twice with methanol. The average pore size of the JEFFAMINE-treated portion was 1.1 microns and the water flux of the sample was then measured as described above and was found to be 16.1 seconds.

Example 6

A sample of TIPS "A" film was saturated with a 10 weight percent solution of SR603 in methanol and was then irradiated with an electron beam dose of 20 kilograys (kGy). This made the film hydrophilic. The film sample was then saturated with a 10 weight percent solution of GMA in methanol and was irradiated with an electron beam dose of 40 kilograys (kGy). The sample was then extracted with MEK and was allowed to dry at room temperature. The sample remained hydrophilic and was then saturated with JEFFAMINE XTJ-504 and the film was then placed in a glass vial and capped. The vial containing the film was heated to a temperature of 60° C. for 45 minutes. The vial was allowed to cool to room temperature, after which time the film sample was removed and was rinsed twice with methanol. The average pore size of the film sample was evaluated as described above and was found to be larger than that of the starting TIPS "A" film.

Portions of this film were found to rapidly (i.e., nearly instantly) absorb drops of water that were placed on the surface of the film.

Example 7

A sample of TIPS "A" film was saturated with a methanol solution that contained 20 weight percent each SR603 and GMA. The film was then irradiated with an electron beam dose of 40 kilograys (kGy). The sample was then extracted with MEK and was allowed to dry at room temperature. A portion of the sample was then saturated with JEFFAMINE XTJ-504 and the film was then placed in a glass vial and capped. The vial containing the film was heated to a temperature of 60° C. for 45 minutes. The vial was allowed to cool to room temperature, after which time the film sample was removed and was rinsed twice with methanol. The average pore size of the film sample was evaluated as described above and was found to be larger than that of the starting TIPS "A" film. This film was found to rapidly (i.e., nearly instantly) absorb drops of water that were placed on the surface of the film.

Example 8

A sample of TIPS "A" film was saturated with a 10 weight percent solution of SR344 in methanol and was then irradiated with an electron beam dose of 20 kilograys (kGy). The sample was then rinsed with MEK and was then allowed to dry at room temperature. A portion of the sample was then saturated with JEFFAMINE XTJ-504 and the film was then placed in a glass vial and capped. The vial containing the film was heated to a temperature of 60° C. for 45 minutes. The vial was allowed to cool to room temperature, after which time the film sample was removed and was rinsed twice with methanol. The average pore size of the film sample was evaluated as described above and was found to be centered at approximately 0.8 micrometers.

Comparative Examples 2-4

The average pore sizes of sets of samples of TIPS "A" film was determined as described above. One set of samples (Comparative Example 2) was irradiated with an electron beam dose of 40 kilograys (kGy), one set of samples (Comparative Example 3) was irradiated with an electron beam dose of 100 kilograys (kGy), and one set of samples (Comparative Example 4) was saturated with methanol and was irradiated with an electron beam dose of 40 kilograys (kGy). The average pore sizes of the irradiated samples were then determined and were found to be essentially equivalent to those of the samples before they were irradiated.

Comparative Example 5

The average pore size of a sample of TIPS "A" film was determined as described above. The sample was then heated to 120° C. in an oven. After the sample was allowed to cool to room temperature, the average pore size of the sample was then determined and was found to be essentially equivalent to that of the sample before it was heated.

Examples 9-11

Three samples of TIPS "A" film were saturated with a 10 weight percent solution of SR344 in methanol. One of the samples was then irradiated with an electron beam at a dose of 20 kilograys (kGy) (Example 9), one of the samples was irradiated at a dose of 40 kGy (Example 10), and one of the samples was irradiated at a dose of 60 kGy (Example 11). Each sample was then rinsed three times with water and each was placed in water that was heated to 70° C. for one hour. Each sample was observed to be readily wetted by the water. The average pore sizes of the irradiated samples were then determined and were found to be greater than that of TIPS "A" film that had not been irradiated.

Examples 12-14

Three samples of TIPS "A" film were saturated with a 25 weight percent solution of SR603 in methanol. One of the samples was then irradiated with an electron beam at a dose of 20 kilograys (kGy) (Example 12), one of the samples was irradiated at a dose of 40 kGy (Example 13), and one of the samples was irradiated at a dose of 60 kGy (Example 14). Each sample was then rinsed three times with water and then each was placed in water that was heated to 70° C. for one hour. Each sample was observed to be readily wetted by the water. The average pore sizes of the irradiated samples were then determined and were found to be greater than that of TIPS "A" film that had not been irradiated.

Example 15

The average pore size and water flux of a sample of each of DURAPORE "A" film and DURAPORE "B" film was determined. A sample of DURAPORE "B" film was saturated with a 20 weight percent solution of GMA in methanol and was irradiated with an electron beam dose of 40 kilograys (kGy). The sample was then extracted with MEK and was allowed to dry at room temperature. The film was then saturated with JEFFAMINE XTJ-504 and the film was then placed in a glass vial and capped. The vial containing the film was heated to a temperature of 60° C. for one hour. The vial was allowed to cool to room temperature, after which time the film sample was removed and was rinsed twice with methanol. The rinsed film samples were then allowed to dry at room temperature. When a drop of water was placed on the film sample, the drop was observed to be rapidly (i.e., nearly instantly) absorbed by the film sample. The average pore size and water flux of the sample were determined as described above, and both values were found to be essentially equivalent to those of DURAPORE "A" film.

Example 16

The average pore size and water flux of a sample of each of DURAPORE "A" film and DURAPORE "B" film was determined. A sample of DURAPORE "B" film was saturated with a 10 weight percent solution of SR344 in methanol and was then irradiated with an electron beam at a dose of 20 kilograys (kGy). The sample was then rinsed three times with water and was placed in water that was heated to 70° C. for one hour. The sample was observed to be readily wetted by the water. The average pore size and water flux of this sample were determined as described above, and both values were found to be essentially equivalent to those of DURAPORE "A" film.

Examples 17-22

In Examples 17-22, samples of TIPS "A" film were saturated with SR344 or SR603 and were then irradiated with an electron beam as indicated in Table 3. In Table 3, the electron beam radiation dose is given with integers separated by "+" to indicate that the same sample was sequentially irradiated (i.e., irradiated more than once) at the dose given in the Table. After the samples were irradiated, the water flux of a first piece of the sample was measured as described above. A second piece of the sample was heated in an oven at 60° C. for one hour and then the sample was allowed to cool to room temperature. The water flux of the second piece of sample was then measured as described above. The data are given in Table 3. In Table 3, the term "Monomer" refers to the PEG diacrylate (SR344) or PEG dimethacrylate (SR603) that was used to saturate the film samples, the term "Dose" refers to the electron beam radiation dose in kGy, the term "Flux 1" refers to the water flux time (in seconds) of the first piece of sample, and the term "Flux 2" refers to the water flux time (in seconds) of the second piece of sample (i.e., the piece that was heated at 60° C. for one hour).

TABLE 3

Data for Examples 17-22

| Example | Monomer | Dose (kGy) | Flux 1 (seconds) | Flux 2 (seconds) |
| --- | --- | --- | --- | --- |
| 17 | 20% SR603 | 60 | 28.8 | 32.0 |
| 18 | 20% SR603 | 20 + 40 | 22.4 | 19.5 |
| 19 | 20% SR603 | 40 | 26.3 | 18.4 |
| 20 | 20% SR603 | 20 + 20 + 20 | 21.6 | 18.5 |
| 21 | 20% SR603 | 20 + 20 | 24.8 | 20.7 |
| 22 | 20% SR344 | 20 + 20 + 20 | 28.6 | 23.0 |

Examples 23-26

In Examples 23, 25, and 26, samples of TIPS "A" film were saturated with a 10 weight percent solution of SR344 in methanol. In Example 24, a sample of TIPS "A" film was saturated with a 20 weight percent solution of SR603 in methanol. Each of the samples was irradiated with an electron beam at a dose of 20 kGy, as indicated in Table 4. Each sample was then washed with methanol and was allowed to dry. The films of Examples 24 and 26 were then saturated with a 20 weight percent solution of CD553 in methanol. The film of Example 25 was then saturated with a 10 weight percent solution of CD553 in methanol. The film of Example 23 was then saturated with a 20 weight percent solution of SR603 in methanol. The films of Examples 24-26 were then irradiated an electron beam at a dose of 20 kGy, as indicated in Table 4. The film of Example 23 was then irradiated to an electron beam dose of 40 kGy, as indicated in Table 4. In Table 4, the designations of the two monomers used in each of Examples 23-26 are separated by "/". In Table 4, the electron beam doses that are listed for each irradiation step are separated by "–". Each sample was then washed with methanol and was allowed to dry. After the samples were irradiated, the water flux of a first piece of the sample was measured as described above. A second piece of the sample was heated in an oven at 60° C. for one hour and then the sample was allowed to cool to room temperature. The water flux of the second piece of sample was then measured as described above. The data are given in Table 4. In Table 4, the term "Monomer" refers to the PEG 400 diacrylate (SR344) or PEG 400 dimethacrylate (SR603) that was used to saturate the film samples, the term "Dose" refers to the electron beam radiation dose in kGy, the term "Flux 1" refers to the water flux time (in seconds) of the first piece of sample, and the term "Flux 2" refers to the water flux time (in seconds) of the second piece of sample (i.e., the piece that was heated at 60° C. for one hour).

TABLE 4

Data for Examples 23-26

| Example | Monomer | Dose kGy | Flux 1 (seconds) | Flux 2 (seconds) |
| --- | --- | --- | --- | --- |
| 23 | 10% SR344/20% SR603 | 20 – 40 | 19.0 | 32.0 |
| 24 | 20% SR603/20% CD553 | 20 – 20 | 29.5 | 21.4 |
| 25 | 10% SR344/10% CD553 | 20 – 20 | 28.4 | 23.5 |
| 26 | 10% SR344/20% CD553 | 20 – 20 | 28.6 | 21.2 |

Example 27

A sample of TIPS "A" film was saturated with a 10 weight percent solution of SR344 in methanol and was then irradiated with an electron beam dose of 20 kilograys (kGy). The sample was then allowed to dry at room temperature. The film sample was then saturated with a 20 weight percent solution of GMA in methanol and was again irradiated with an electron beam dose of 40 kilograys (kGy). The sample was then extracted with MEK and then with water and was allowed to dry at room temperature. A portion of the sample was then saturated with a 20% aqueous solution of urea and heated in an oven at a temperature of 60° C. for 45 minutes. The film sample was removed and was rinsed twice with water and was allowed to dry at room temperature. The water flux of the sample was then measured as described above and was found to be 15.9 seconds.

Example 28

A sample of TIPS "A" film was saturated with a 10 weight percent solution of GMA in methanol and was then irradiated with an electron beam dose of 40 kilograys (kGy). The sample was then extracted with MEK and was allowed to dry at room temperature. The non-water absorbent film sample was then saturated with JEFFAMINE XTJ-504 and the film was then placed in a glass vial and capped. The vial containing the film was heated to a temperature of 60° C. for one hour. The vial was allowed to cool to room temperature, after which time the film sample was removed and was rinsed twice with methanol. The rinsed film sample was then allowed to dry at room temperature. When a drop of water was placed on the film sample, the drop was observed to be rapidly (i.e., nearly instantly) absorbed by the film sample. The water flux of the sample was then measured as described above and was found to be 15.5 seconds.

Example 29

A sample of TIPS "A" film was saturated with a 20 weight percent solution of GMA in methanol and was irradiated with an electron beam dose of 40 kilograys (kGy). The sample was then extracted with MEK and was allowed to dry at room temperature. The film was then saturated with DETA and the film was then placed in an oven at a temperature of 60° C. for one hour. The sample was allowed to cool to room temperature, after which time the film sample was rinsed twice with methanol. The rinsed film samples were then allowed to dry at room temperature. The water flux of the sample was then measured as described above and was found to be 16.0 seconds.

Comparative Example 6

The water flux of a sample of TIPS "B" film was measured as described above and was found to be greater than 6 minutes.

Example 30

A sample of TIPS "B" film was saturated with a 10 weight percent solution of SR344 in methanol and was then irradiated with an electron beam dose of 20 kilograys (kGy). The sample was then rinsed with methanol and was allowed to dry at room temperature. The water flux of a first portion of the sample was measured as described above and was found to be approximately 5 minutes. A second portion of the sample was heated in an oven at 60° C. for one hour and then the sample was allowed to cool to room temperature. The water flux of this second portion of the sample was then measured as described above and was found to be approximately 3.5 minutes.

Example 31

The film sample of Example 30 that was allowed to dry at room temperature was saturated with a 20 weight percent solution of GMA in methanol and was irradiated with an electron beam dose of 40 kilograys (kGy). The sample was then extracted with MEK and was allowed to dry at room temperature. A portion of the sample was then saturated with JEFFAMINE XTJ-504 and the film was then placed in a ZIPLOC bag, which was sealed and was placed in a water bath at a temperature of 60° C. for one hour. The bag containing the sample was allowed to cool to room temperature, after which time the film sample was removed and was rinsed twice with methanol and was allowed to dry at room temperature. The water flux of the sample was then measured as described above and was found to be approximately 2.5 minutes.

Example 32

A sample of TIPS "A" film was saturated with a 10 weight percent solution of SR344 in methanol and was then irradiated with an electron beam dose of 20 kilograys (kGy). The sample was then rinsed three times with water and was allowed to dry at room temperature. The film sample was then saturated with a 20 weight percent solution of GMA in methanol and was irradiated with an electron beam dose of 20 kilograys (kGy). The sample was then extracted with MEK and then with water and was allowed to dry at room temperature. A piece of the sample was then saturated with a mixture of 16.7 weight percent DETA and 16.7 JEFFAMINE XTJ-504 in water, the film was heated in an oven at a temperature of 90° C. for 15 minutes. The film was rinsed twice with water and allowed to dry at room temperature. The film sample was observed to be readily wetted by water.

Example 33

A sample of DURAPORE "B" film was treated essentially as described in Example 32. The film sample was observed to be readily wetted by water.

Example 34

A sample of TIPS "A" film was saturated with a 20 weight percent solution of GMA in methanol and was irradiated with an electron beam dose of 40 kilograys (kGy). The sample was then extracted with MEK and was allowed to dry at room temperature. A piece of the sample was then saturated with a mixture of 16.7 weight percent DETA and 16.7 JEFFAMINE XTJ-504 in water, and the film was then placed in an oven at a temperature of 90° C. for 15 minutes. The sample was allowed to cool to room temperature, after which time it was rinsed twice with water and was allowed to dry at room temperature. The film sample was observed to be readily wetted by water.

Comparative Example 7

A sample of TIPS "A" film was saturated with DETA. The film was then heated in an oven at a temperature of 65° C. for 15 minutes. The film sample was rinsed twice with water. The rinsed film sample was allowed to dry at room temperature. When a drop of water was placed on the film sample, the drop was observed not to be absorbed by the film.

Example 35

A sample of hydrophilic EVOH film was saturated with a 20 weight percent solution of APTAC in methanol and was then irradiated with an electron beam dose of 40 kilograys (kGy). The sample was then rinsed three times with water and was allowed to dry at room temperature. The film sample was observed to still be hydrophilic. A 1 weight percent aqueous solution of Ponceau S dye was then passed through the film by mounting the film in a holder on a filter flask and using vacuum to pull the dye solution through the film. The film was then exhaustively washed with water. The film was red in color after this washing step.

Comparative Example 8

A 1 weight percent aqueous solution of Ponceau S dye was passed through EVOH film by mounting the film in a holder on a filter flask and using vacuum to pull the dye solution through the film. The film was then exhaustively washed with water. The film was not red in after this washing step.

Example 36

A sample of PES "A" film that takes about 8 seconds to wet through was saturated with a 10 weight percent solution of SR344 in methanol and was then irradiated with an electron beam dose of 40 kilograys (kGy). The sample was then rinsed with MEK and was then allowed to dry at room temperature. When a drop of water was placed on the film sample (shinny side down—this film has sidedness in the form of a skin layer), the drop was observed to be more rapidly (i.e., nearly instantly) absorbed by the film sample.

Example 37

A sample of PES "B" film was saturated with a 20 weight percent solution of APTAC in methanol and was then irradiated with an electron beam dose of 40 kilograys (kGy). The sample was then rinsed three times with water and was allowed to dry at room temperature. The film sample was observed to be readily wetted by water. A 1 weight percent aqueous solution of Ponceau S dye was then passed through the film by mounting the film in a holder on a filter flask and using vacuum to pull the dye solution through the film. The film was then exhaustively washed with water. The film was light red in color after this washing step. If a film sample has a skin layer on one side, the skin layer is placed down in the holder for these tests.

Comparative Example 9

A 1 weight percent aqueous solution of Ponceau S dye was passed through PES "B" film by mounting the film in a holder on a filter flask and using vacuum to pull the dye solution through the film. The film was then exhaustively washed with water. The film was not red in color after this washing step.

Example 38

A sample of NYLAFLO film was saturated with a 20 weight percent solution of APTAC in methanol and was then irradiated with an electron beam dose of 40 kilograys (kGy). The sample was then rinsed three times with water and was allowed to dry at room temperature. The film sample was observed to be readily wetted by water. A 1 weight percent aqueous solution of Ponceau S dye was then passed through the film by mounting the film in a holder on a filter flask and using vacuum to pull the dye solution through the film. The film was then exhaustively washed with water. The film was red in color after this washing step.

Comparative Example 10

A 1 weight percent aqueous solution of Ponceau S dye was passed through NYLAFLO film by mounting the film in a holder on a filter flask and using vacuum to pull the dye solution through the film. The film was then exhaustively washed with water. The film was light pink in color after this washing step.

Example 39

A sample of TIPS "C" film was saturated with a 10 weight percent solution of SR344 in methanol and was then irradiated with an electron beam dose of 10 kilograys (kGy). The sample was then rinsed with methanol and was then allowed to dry at room temperature. When a drop of water was placed on the film sample, the drop was observed to be rapidly (i.e., nearly instantly) absorbed by the film sample.

Example 40

A sample of TIPS "C" film was treated essentially as described in Example 39, except that the film was irradiated with an electron beam dose of 20 kilograys (kGy). When a drop of water was placed on the film sample, the drop was observed to be rapidly (i.e., nearly instantly) absorbed by the film sample.

Example 41

A sample of TIPS "A" film was saturated with a 20 weight percent solution of SR603 in methanol and was then irradiated with an electron beam dose of 20 kilograys (kGy). The sample was then rinsed with methanol and was then allowed to dry at room temperature. This film was then saturated with a solution of 20 weight percent AMPS in aqueous methanol and was then irradiated with an electron beam dose of 30 kilograys (kGy). The film was then rinsed with water and was allowed to dry. When a drop of water was placed on the film sample, the drop was observed to be rapidly (i.e., nearly instantly) absorbed by the film sample. A 1 weight percent aqueous solution of Methylene Blue dye was then passed through the film by mounting the film in a holder on a filter flask and using vacuum to pull the dye solution through the film. The film was then exhaustively washed with water. The film was blue in color after this washing step.

Example 42

A sample of TIPS "A" film was saturated with a 20 weight percent solution of SR603 in methanol and was then irradiated with an electron beam dose of 20 kilograys (kGy). The sample was then rinsed with methanol and was then allowed to dry at room temperature. This film was then saturated with a solution of 20 weight percent APTAC in aqueous methanol and was then irradiated with an electron beam dose of 30 kilograys (kGy). The film was then rinsed with water and was allowed to dry. When a drop of water was placed on the film sample, the drop was observed to be rapidly (i.e., nearly instantly) absorbed by the film sample. A 1 weight percent aqueous solution of Ponceau S dye (a red dye) was then passed through the film by mounting the film in a holder on a filter flask and using vacuum to pull the dye solution through the film. The film was then exhaustively washed with water. The film was red in color after this washing step.

Example 43

A sample of TIPS "A" film was treated essentially as described in Example 42, except that AETAC was used in place of APTAC. When a drop of water was placed on the film sample, the drop was observed to be rapidly (i.e., nearly instantly) absorbed by the film sample. A 1 weight percent aqueous solution of Ponceau S dye was then passed through the film by mounting the film in a holder on a filter flask and using vacuum to pull the dye solution through the film. The film was then exhaustively washed with water. The film was red in color after this washing step.

Example 44

A sample of TIPS "A" film was saturated with a 20 weight percent solution of GMA in methanol and was irradiated with an electron beam dose of 40 kilograys (kGy). The sample was then extracted with MEK and was allowed to dry at room temperature. A piece of the still hydrophobic sample was then saturated with a 20 weight percent solution of JEFFAMINE T-5000 in MEK, and the film was then placed in a glass vial and capped. The vial containing the wet film was heated to a temperature of 60° C. for 45 minutes. The vial was allowed to cool to room temperature, after which time the film sample was removed and was rinsed with water and then with 2-propanol and was allowed to dry. The film sample was observed to be readily wetted by water.

Example 45

A sample of PVDF non-woven film, prepared according to Preparative Example 1, was saturated with a 20 weight percent solution of APTAC in aqueous methanol and was then irradiated with an electron beam dose of 40 kilograys (kGy). The sample was then washed with water and was allowed to dry at room temperature. A 1 weight percent aqueous solution of Ponceau S dye was then passed through the film by mounting the film in a holder on a filter flask and using vacuum to pull the dye solution through the film. The nonwoven film was then exhaustively washed with water. The film was red in color after this washing step.

Example 46

A sample of TIPS "C" film was treated essentially as described in Example 35 except that the film was saturated with isopropanol before the Ponceau S dye solution was flushed through the film. After the film was then exhaustively flushed with water, the film was pink in color.

Example 47

A sample of TIPS "A" film was saturated with a 10 weight percent solution of SR344 in methanol and was then irradiated with an electron beam dose of 20 kilograys (kGy) in the manner described above. The film sample was then saturated with a 20 weight percent solution of GMA in methanol and was again irradiated with an electron beam to a dose of 40 kilograys (kGy) in the manner described above. The film sample was then placed in a jar and immersed in a solution of 10% sodium sulfite, 15% 2-isopropanol and 75% water. The jar was capped and heated to a temperature of 80° C. for 90 minutes. The jar was allowed to cool to room temperature, after which time the film sample was removed and was rinsed with water and allowed to dry. When a drop of water was placed on the film sample, the drop was observed to be rapidly (i.e., nearly instantly) absorbed by the film sample. The water flux of the sample was then measured as described above and was found to be 23 seconds. A 1 weight percent aqueous solution of Methylene Blue dye was then passed through the film by mounting the film in a holder on a filter flask and using vacuum to pull the dye solution through the film. The film was then exhaustively washed with water. The film was blue in color after this washing step.

Example 48

In a nitrogen-filled glove box, a sample of TIPS "D" film was saturated with 2-vinyl-4,4-dimethylazlactone (available from TCI America, Portland, Oreg.). The saturated film was transferred to a ZIPLOC bag which was then sealed and removed from the glove box. The film sample in the ZIPLOC bag was then irradiated with an electron beam dose of 40 kilograys (kGy). The film sample was then removed from the bag and was allowed to dry at room temperature. The film sample was then analyzed by FTIR. The infrared spectrum showed peaks that indicated that the azlactone moiety was present on the surface of the film.

Example 49

A sample of TIPS "D" film was treated essentially as described in Example 48, expect that 2-isocyanatoethyl methacrylate was used instead of 2-vinyl-4,4-dimethylazlactone. The film sample was then analyzed by FTIR. The infrared spectrum showed peaks that indicated that isocyanato groups were present on the surface of the film.

Example 50

A sample of PVDF nonwoven web, prepared according to Preparative Example 2, was imbibed and fully saturated with a solution comprising 68% methanol, 8% water and 24% (3-acrylamidopropyl)trimethylammonium chloride (APTAC available from Aldrich) and sandwiched between 100 μm thick polyethylene terephthalate (PET) cover sheets. The sample sandwich was processed through an electron beam at a dose of 40 kilograys (kGy) (@300 kv) and allowed to remain closed for at least 1 minute after irradiation. The sandwich was opened and the treated web was removed and rinsed 3 times in a tray of deionized (DI) water.

Functionality testing was conducted by placing a 47 mm sized disk of the treated nonwoven web in a 20 ml vial with 16 ml of a 0.0032 M solution of METANIL Yellow dye (available from Alfa Aesar (Ward Hill, Mass.)) and 4 ml of DI water. The vials were agitated by rocking for 12 hours to ensure the dye solution was in equilibrium with the treated disk. The result was an orange web where the negative dye was bound to the positively charged APTAC grafted EVOH nonwoven and the remaining dye solution in the vial was almost clear. The dye was bound to the grafted nonwoven fibers. The control EVOH film without the APTAC graft was tested in the same manner. Little or no binding occurred based on the intensity of the dye color remaining in solution. The bound dye does not rinse off the web with water.

Example 51

A sample of PVDF nonwoven web, prepared according to Preparative Example 2, was imbibed and fully saturated with a solution comprising 52% methanol, 24% water and 24% (2-acrylamido-2-methylpropanesulfonic acid sodium salt (AMPS) and sandwiched between 100 μm thick PET cover sheets. The sample sandwich was processed through an electron beam at a dose of 40 kilograys (kGy) (@300 kv) and allowed to remain closed for at least 1 minute after irradiation. The sandwich was opened and the treated web removed and rinsed 3 times in a tray of DI water.

Functionality testing was conducted by placing a 47 mm sized disk of the treated nonwoven web in a 20 ml vial with 16 ml of a 0.0032 M solution of quinaldine red dye (available from TCI (Tokyo Japan)) and 4 ml of DI water. The vials were agitated by rocking for 12 hours to ensure the dye solution was in equilibrium with the treated disk. The result was a purple web where the positive dye was bound to the negatively charged AMPS grafted EVOH nonwoven and the remaining dye solution was almost clear. The dye was bound to the nonwoven coated fibers. The control EVOH film without the AMPS graft was tested in the same manner and exhibited little or no dye binding based on the intensity of the dye color remaining in solution. The bound dye does not rinse off the web with water.

Example 52

A sample of TIPS "A" film was used except the film was made by casting the melt onto the patterned chrome casting wheel, which had been coated with a thin layer of triacetin to minimize the degree of "skinning" that can occur when the melt is cast directly onto a metal surface resulting in the surface of the melt crystallizing faster than the bulk of the melt (i.e. skinning). The film thickness was about 56 μm. A slight skin on the film can limit the amount of APTAC monomer that can be grafted before a reduction in flux occurs.

The film was saturated with a 10 wt % solution of SR344 in methanol, sandwiched between 100 μm thick PET cover sheets, and then irradiated with an electron beam dose of 20 kilograys (kGy) in the manner as previously described. The sample sandwich was opened after waiting at least one minute and the film then removed and rinsed with DI water twice (in a tray) and allowed to dry. The film sample was then saturated with a 24% solution of APTAC (75% monomer in water) in methanol and was again irradiated with an electron beam to a dose of 40 kilograys (kGy) in the manner described before. The sandwich was opened after waiting at least one minute and the film rinsed with DI water three times (in a tray) and allowed to air dry.

Functionality testing was conducted by placing a 47 mm sized disk of the treated PVDF web in a 8 ml vial with 5 ml of a 0.0016 M solution of METANIL Yellow dye (available from Alfa Aesar (Ward Hill, Mass.)) and 3 ml of DI water. The vial was agitated by rocking for 12 hours to ensure the dye solution was in equilibrium with the treated disk. The result was a green tinted film (originally blue) where the negative dye was bound to the positively charged APTAC grafted PVDF film and the dye solution was almost clear. The dye was bound to the membrane and did not rinse off with water.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. An article comprising:
   a porous base substrate having interstitial and outer surfaces, wherein the porous base substrate comprises a porous membrane, a porous nonwoven web, or a porous fiber; and
   grafted species extending from the surfaces of the porous base substrate, said grafted species being directly bonded to said surfaces of said porous base substrate via a graft polymerization reaction between (i) a free-radically polymerizable group of one or more grafting monomers and (ii) said surfaces of said porous base substrate;
   wherein (1) at least one of the grafted species comprises the reaction product of (a) an epoxy group of the one or more grafting monomers and (b) a nucleophilic compound comprising a polyalkylene glycol diamine or a polyalkylene glycol triamine, and (2) at least one of the grafted species comprises the reaction product of (a) a polyalkylene glycol di(meth)acrylate and (b) the surfaces of the porous base substrate.

2. The article of claim 1, wherein the porous base substrate is microporous.

3. The article of claim 1, wherein the porous base substrate comprises a microporous, thermally-induced phase separation membrane.

4. The article of claim 3, wherein the thermally-induced phase separation membrane comprises poly(vinylidene fluoride).

5. An article comprising:
   a porous base substrate having interstitial and outer surfaces;
   and grafted species extending from the surfaces of the porous base substrate, said grafted species being directly bonded to said surfaces of said porous base substrate via an electron beam initiated graft polymerization reaction between (i) a free-radically polymerizable group of one or more grafting monomers and (ii) said surfaces of said porous base substrate;
   wherein the grafted species comprise a first grafted species comprising the reaction product of (a) a polyalkylene glycol di(meth)acrylate and (b) the surfaces of the porous base substrate, said first grafted species being present in an amount of from about 20 to about 100 wt % based on a total weight of the porous base substrate, and wherein the grafted species comprise a second grafted species comprising the reaction product of (i) a grafted monomer comprising an epoxy group, an isocyanato group, or an azlactone group with (ii) a nucleophilic compound comprising a polyalkylene glycol diamine or a polyalkylene glycol triamine.

6. The article of claim 5, wherein the porous base substrate comprises a microporous, thermally-induced phase separation membrane.

7. The article of claim 6, wherein said membrane has an average final pore size of 1.2 microns or larger.

* * * * *

UNITED STATES PATENT AND TRADEMARK OFFICE
CERTIFICATE OF CORRECTION

| | | |
|---|---|---|
| PATENT NO. | : 7,553,417 B2 | Page 1 of 1 |
| APPLICATION NO. | : 11/611301 | |
| DATED | : June 30, 2009 | |
| INVENTOR(S) | : Clinton P. Waller, Jr. | |

It is certified that error appears in the above-identified patent and that said Letters Patent is hereby corrected as shown below:

<u>Column 12,</u>
Line 47, delete "thereof," and insert -- thereof; --.
Line 63, delete "thereof," and insert -- thereof; --.

<u>Column 17,</u>
Line 22, delete "thereof," and insert -- thereof; --.

<u>Column 36,</u>
Line 33, delete "(Tokyo Japan)" and insert -- (Tokyo, Japan) --.

Signed and Sealed this

Seventeenth Day of November, 2009

David J. Kappos
*Director of the United States Patent and Trademark Office*